United States Patent
Schaedler et al.

(10) Patent No.: US 10,737,984 B2
(45) Date of Patent: *Aug. 11, 2020

(54) FORMULATIONS AND METHODS FOR 3D PRINTING OF CERAMIC MATRIX COMPOSITES

(71) Applicant: HRL Laboratories, LLC, Malibu, CA (US)

(72) Inventors: Tobias A. Schaedler, Oak Park, CA (US); Zak C. Eckel, Thousand Oaks, CA (US); Scott Biesboer, Santa Monica, CA (US); Kenneth Cante, La Puente, CA (US)

(73) Assignee: HRL Laboratories, LLC, Malibu, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 15/822,197

(22) Filed: Nov. 26, 2017

(65) Prior Publication Data

US 2018/0148379 A1   May 31, 2018

Related U.S. Application Data

(60) Provisional application No. 62/428,203, filed on Nov. 30, 2016, provisional application No. 62/428,207, (Continued)

(51) Int. Cl.
*C04B 35/56* (2006.01)
*C09D 11/037* (2014.01)
(Continued)

(52) U.S. Cl.
CPC .......... *C04B 35/5603* (2013.01); *B28B 1/001* (2013.01); *B29C 64/10* (2017.08); *B29C 64/379* (2017.08); *B33Y 40/00* (2014.12); *B33Y 70/00* (2014.12); *B33Y 80/00* (2014.12); *C04B 35/571* (2013.01); *C04B 35/58* (2013.01); *C04B 35/589* (2013.01); *C04B 35/597* (2013.01); *C04B 35/62218* (2013.01); *C04B 35/62836* (2013.01); *C04B 35/62839* (2013.01); *C04B 35/63448* (2013.01); *C04B 35/64* (2013.01); *C04B 35/806* (2013.01); *C08L 83/08* (2013.01); *C09D 5/004* (2013.01); *C09D 7/61* (2018.01); *C09D 7/62* (2018.01); *C09D 7/67* (2018.01); *C09D 7/68* (2018.01); *C09D 7/69* (2018.01); *C09D 7/70* (2018.01); *C09D 11/03* (2013.01);
(Continued)

(58) Field of Classification Search
CPC ..... C04B 35/597; C04B 35/571; C04B 35/64; C04B 35/63448; C04B 35/62839; C04B 35/62836; C04B 35/32218; C04B 2235/6565; C04B 2235/77; C04B 2235/96; C04B 2235/6562; C04B 2235/3826; C04B 2235/5216; C04B 2235/3895; C04B 35/589; C04B 35/58; C04B 35/806; C08L 83/08; B33Y 80/00; B33Y 40/00; B33Y 10/00; B33Y 70/00; C09D 11/102; C09D 7/61; C09D 11/037; C09D 11/101; C09D 11/03; C09D 5/004; C09D 7/62; C09D 7/70; C09D 7/68; C09D 7/67; C09D 7/69; B17B 1/001; C29C 64/10; C29C 2035/0838; C29C 2035/0827; B29K 2995/003; B29K 2995/0026; B29K 2509/04; B29K 2083/00; B29K 2105/0002; C08G 77/28; C08G 77/20; C08G 77/18; B29C 71/02; B29C 64/129; B29C 64/379; C08K 2201/005; C08K 9/04; C08K 7/00; C08K 3/34
See application file for complete search history.

(56) References Cited

U.S. PATENT DOCUMENTS 3,695,877 A   10/1972  Taneda et al.
3,790,378 A   2/1974   Hayakawa et al.
(Continued)

FOREIGN PATENT DOCUMENTS

WO   2016044547 A1   3/2016

OTHER PUBLICATIONS

Eckel et al., "Additive manufacturing of polymer-derived ceramics" Science, vol. 35, Issue 6268, pp. 58-62 + Supplementary Materials, Jan. 1, 2016.
(Continued)

*Primary Examiner* — Sanza L. McClendon
(74) *Attorney, Agent, or Firm* — O'Connor & Company

(57) ABSTRACT

This invention provides resin formulations which may be used for 3D printing and pyrolyzing to produce a ceramic matrix composite. The resin formulations contain a solid-phase filler, to provide high thermal stability and mechanical strength (e.g., fracture toughness) in the final ceramic material. The invention provides direct, free-form 3D printing of a preceramic polymer loaded with a solid-phase filler, followed by converting the preceramic polymer to a 3D-printed ceramic matrix composite with potentially complex 3D shapes or in the form of large parts. Other variations provide active solid-phase functional additives as solid-phase fillers, to perform or enhance at least one chemical, physical, mechanical, or electrical function within the ceramic structure as it is being formed as well as in the final structure. Solid-phase functional additives actively improve the final ceramic structure through one or more changes actively induced by the additives during pyrolysis or other thermal treatment.

25 Claims, 4 Drawing Sheets

Related U.S. Application Data filed on Nov. 30, 2016, provisional application No. 62/428,213, filed on Nov. 30, 2016, provisional application No. 62/556,388, filed on Sep. 9, 2017.

(51) Int. Cl.

| | |
|---|---|
| C04B 35/58 | (2006.01) |
| C04B 35/589 | (2006.01) |
| C08L 83/08 | (2006.01) |
| C04B 35/571 | (2006.01) |
| C04B 35/597 | (2006.01) |
| B33Y 70/00 | (2020.01) |
| C04B 35/622 | (2006.01) |
| C04B 35/628 | (2006.01) |
| C04B 35/634 | (2006.01) |
| C04B 35/64 | (2006.01) |
| C04B 35/80 | (2006.01) |
| B29C 64/10 | (2017.01) |
| C09D 7/61 | (2018.01) |
| B28B 1/00 | (2006.01) |
| C09D 11/03 | (2014.01) |
| C09D 11/101 | (2014.01) |
| C09D 11/102 | (2014.01) |
| B33Y 40/00 | (2020.01) |
| B33Y 80/00 | (2015.01) |
| B29C 64/379 | (2017.01) |
| C09D 7/40 | (2018.01) |
| C09D 7/62 | (2018.01) |
| C09D 5/33 | (2006.01) |
| B29C 35/08 | (2006.01) |
| B29C 64/129 | (2017.01) |
| B29C 71/02 | (2006.01) |
| C08G 77/18 | (2006.01) |
| C08G 77/20 | (2006.01) |
| C08G 77/28 | (2006.01) |
| B29K 105/00 | (2006.01) |
| C08K 3/34 | (2006.01) |
| B33Y 10/00 | (2015.01) |
| B29K 83/00 | (2006.01) |
| B29K 509/04 | (2006.01) |
| C08K 7/00 | (2006.01) |
| C08K 7/10 | (2006.01) |
| C08K 9/04 | (2006.01) |

(52) U.S. Cl.
CPC .......... *C09D 11/037* (2013.01); *C09D 11/101* (2013.01); *C09D 11/102* (2013.01); *B29C 64/129* (2017.08); *B29C 71/02* (2013.01); *B29C 2035/0827* (2013.01); *B29C 2035/0838* (2013.01); *B29K 2083/00* (2013.01); *B29K 2105/0002* (2013.01); *B29K 2509/04* (2013.01); *B29K 2995/003* (2013.01); *B29K 2995/0026* (2013.01); *B33Y 10/00* (2014.12); *C04B 2235/3826* (2013.01); *C04B 2235/3895* (2013.01); *C04B 2235/483* (2013.01); *C04B 2235/5216* (2013.01); *C04B 2235/5436* (2013.01); *C04B 2235/6026* (2013.01); *C04B 2235/6562* (2013.01); *C04B 2235/6565* (2013.01); *C04B 2235/77* (2013.01); *C04B 2235/96* (2013.01); *C08G 77/18* (2013.01); *C08G 77/20* (2013.01); *C08G 77/28* (2013.01); *C08K 3/34* (2013.01); *C08K 7/00* (2013.01); *C08K 7/10* (2013.01); *C08K 9/04* (2013.01); *C08K 2201/005* (2013.01)

(56) References Cited

U.S. PATENT DOCUMENTS

| | | |
|---|---|---|
| 7,183,335 B2 | 2/2007 | Napadensky |
| 7,964,248 B2 | 6/2011 | Fong et al. |
| 8,906,593 B1 | 12/2014 | Nowak et al. |
| 10,155,884 B2 * | 12/2018 | Kenney ............... B29C 64/106 |
| 10,300,624 B2 * | 5/2019 | Schmidt ................ C08K 9/04 |
| 2006/0069176 A1 | 3/2006 | Bowman et al. |
| 2006/0208388 A1 | 9/2006 | Bredt et al. |
| 2008/0194721 A1 | 8/2008 | Amey et al. |
| 2009/0148813 A1 | 6/2009 | Sun et al. |
| 2010/0269721 A1 | 10/2010 | Takahashi et al. |
| 2010/0279007 A1 | 11/2010 | Briselden et al. |
| 2014/0131908 A1 | 5/2014 | Sun et al. |
| 2016/0107331 A1* | 4/2016 | Schmidt ................ C08K 9/04 264/401 |
| 2016/0128909 A1 | 5/2016 | Fontein et al. |
| 2016/0244625 A1 | 8/2016 | Clapp et al. |
| 2016/0332382 A1 | 11/2016 | Coward et al. |
| 2017/0204227 A1 | 7/2017 | Eckel |
| 2018/0148585 A1* | 5/2018 | Eckel .................... B33Y 70/00 |

OTHER PUBLICATIONS

Colombo et al., "Multifunctional advanced ceramics from preceramic polymers and nano-sized active fillers" Journal of the European Ceramic Society 33 (2013) 453-469.

Duan et al., "A review of absorption properties in silicon-based polymer derived ceramics" Journal of the European Deramic Society 36 (2016) 3681-3689.

\* cited by examiner

FORMULATIONS AND METHODS FOR 3D PRINTING OF CERAMIC MATRIX COMPOSITES

PRIORITY DATA

This patent application is a non-provisional application with priority to U.S. Provisional Patent App. No. 62/428,203, filed Nov. 30, 2016; U.S. Provisional Patent App. No. 62/428,207, filed Nov. 30, 2016; and U.S. Provisional Patent App. No. 62/428,213, filed Nov. 30, 2016, and U.S. Provisional Patent App. No. 62/556,388, filed Sep. 9, 2017, each of which is hereby incorporated by reference herein.

FIELD OF THE INVENTION

The present invention generally relates to monomer formulations suitable for making preceramic polymers, which can be converted into ceramic matrix composites and other ceramic structures.

BACKGROUND OF THE INVENTION

Ceramic matrix composite (CMC) materials overcome many disadvantages of conventional ceramics, such as brittle failure, low fracture toughness, and limited thermal shock resistance. Applications of ceramic matrix composites include those requiring reliability at high temperatures (beyond the capability of metals or polymers) and resistance to corrosion and wear.

There is also high commercial demand for additively manufactured (3D-printed) ceramics in fields including industrial filtration (molten metal filters, flow separators); metal processing (casting molds/blanks); implantable dental and medical devices; and semiconductor processing. Additive manufacturing of ceramic materials is also of interest for propulsion components, thermal protection systems, porous burners, microelectromechanical systems, and electronic device packaging, for example.

No mature method for 3D printing ceramic matrix composites exists. Currently, CMC materials are limited to manual lay-up, molding, or thermoforming. There are also known techniques for sintering ceramic particles or using ceramic particles printed in a binder, both of which typically produce porous ceramics which have lower strength than the parent material. Ceramic structures are typically sintered as compacted porous materials, severely limiting the manufacturable geometries.

Formulations have been described for creating ceramic materials, which can be printed (additively manufactured) with various methods such as stereolithography techniques and laser sintering. These are typically unreinforced ceramics that do not contain a second phase and suffer from low fracture toughness. These methods are described in Zocca et al., "Additive Manufacturing of Ceramics: Issues, Potentialities, and Opportunities", *J. Am. Ceram. Soc.*, 98 [7] 1983-2001 (2015).

In addition, formulations which can create 1D or 2D ceramics, or very small 3D structures, have been described. See U.S. Pat. No. 4,816,497 issued Mar. 28, 1989 to Lutz et al.; U.S. Pat. No. 5,698,485 issued Dec. 16, 1997 to Bruck et al.; U.S. Pat. No. 6,573,020 issued Jun. 3, 2003 to Hanemann et al.; U.S. Pat. No. 7,582,685 issued Sep. 1, 2009 to Arney et al.; and U.S. Patent App. Pub. No. US2006/0069176A1 published Mar. 30, 2006 to Bowman et al.

In comparison with metals and polymers, ceramics are difficult to process, particularly into complex shapes. Because they cannot be cast or machined easily, ceramics are typically consolidated from powders by sintering or deposited in thin films. Flaws, such as porosity and inhomogeneity introduced during processing, govern the strength because the flaws initiate cracks, and—in contrast to metals—brittle ceramics have little ability to resist fracture. This processing challenge has limited the ability to take advantage of ceramics' impressive properties, including high-temperature capability, environmental resistance, and high strength. Recent advances in additive manufacturing have led to a multitude of different techniques, but all additive manufacturing techniques developed for ceramic materials only process unreinforced ceramics and not ceramic matrix composites. Only a few of the commercially available three-dimensional (3D) printing systems offer printing of ceramics, either by selective curing of a photosensitive resin that contains ceramic particles, selective deposition of a liquid binder agent onto ceramic particles (binder jetting), or selective fusion of a powder bed with a laser. All these techniques are limited by slow fabrication rates, and in many cases, a time-consuming binder removal process. By starting with powders that need to be consolidated to a dense part, it is an almost insurmountable challenge to add reinforcement and create ceramic matrix composites without fusing or reacting the matrix and the second phase, losing reinforcing capability. Furthermore, many additive processes introduce large thermal gradients that tend to cause cracks in ceramics. Pores, cracks, and inhomogeneities are often responsible for the low strength and poor reliability of additively manufactured ceramic parts.

Preceramic polymers are a class of polymers which allow, via a thermal treatment, a conversion of a polymer part to a ceramic material. Typically, these preceramic polymers contain silicon (Si) in the molecular backbone, with the resulting material containing Si. There are a wide variety of known preceramic polymers. Examples include polysilazanes, borazine-modified hydridopolysilazanes, polysilanes, polycarbosilanes, silicone resins, polyvinylborazine, polyborazylene, and decaborane-based polymers. These preceramic polymers have been used to form specific polymer-based structures that can be subsequently heat-treated (pyrolyzed or sintered) to create near net-shape ceramic structures.

A stereolithography technique provides a method to build a 3D polymer microstructure in a layer-by-layer process. This process usually involves a platform (e.g., substrate) that is lowered into a photomonomer bath in discrete steps. At each layer, a laser is used to scan over the area of the photomonomer that is to be cured (i.e., polymerized) for that particular layer. Once the layer is cured, the platform is lowered by a specific amount, determined by the processing parameters and desired feature/surface resolution, and the process is repeated until the complete 3D structure is created. One example of such a stereolithography technique is disclosed in U.S. Pat. No. 4,575,330 issued Mar. 11, 1986 to Hull et al.

Modifications to the above-described stereolithography technique have been developed to improve the polymer resolution by using laser optics and special resin formulations. Also, modifications have been made to decrease the fabrication time of the 3D polymer structure by using a dynamic pattern generator to cure an entire layer at once. One example of such a modification is disclosed in Bertsch et al., "Microstereo-lithography: A Review," *Materials Research Society Symposium Proceedings*, Vol. 758, 2003.

Another advancement to the standard stereolithography technique includes a two-photon polymerization process, as disclosed in Sun et al., "Two-Photon Polymerization And 3D Lithographic Microfabrication," *Advances in Polymer Science*, Vol. 170, 169-273, 2004.

There exists a need for creating ceramic parts of various sizes through 3D printing, for engineering and other applications. Lower-cost structures that are lightweight, strong, and stiff, but can withstand a high-temperature oxidizing environment, are sought. There is a desire for a method of direct 3D printing of ceramics reinforced with particles, whiskers, or fibers, also known as ceramic matrix composite structures.

SUMMARY OF THE INVENTION

The present invention addresses the aforementioned needs in the art, as will now be summarized and then further described in detail below.

Some variations provide a 3D-printing composition comprising:

(a) from about 10 vol % to about 99 vol % of one or more preceramic, UV-curable, silicon-containing monomers in a liquid phase; and (b) from about 1 vol % to about 70 vol % of solid-phase fillers, wherein the solid-phase fillers may be selected from the group consisting of SiOC, SiCN, SiC, SiCBN, SiOCN, SiAlON, $Si_3N_4$, $SiO_2$, silicate glasses, $Al_2O_3$, $ZrO_2$, $TiO_2$, carbon, TiC, ZrC, HfC, $Y_3Al_5O_{12}$, $B_4C$, BN, TiN, ZrN, AlN, and combinations thereof.

In some embodiments, the preceramic, UV-curable, silicon-containing monomers are selected from the group consisting of silazanes, siloxanes, silanes, carbosilanes, and combinations, analogues, or derivatives thereof.

In some embodiments, the solid-phase fillers are in the form of fibers, whiskers, nanotubes, nanorods, flat platelets, microparticles with average diameter from 1 micron to 100 microns, nanoparticles with average diameter from 1 nanometer to 1000 nanometers, or combinations thereof.

In certain embodiments, the solid-phase fillers are in the form of fibers with average length from 1 micron to 100 microns and with average diameter that is less than 10% of the average length, and wherein the solid-phase fillers are selected from the subgroup consisting of $Si_3N_4$, $Al_2O_3$, $SiO_2$, BN, $Y_3Al_5O_{12}$, $ZrO_2$, and combinations thereof.

In certain embodiments, the solid-phase fillers are coated with an interfacial coating that includes a material such as (but not limited to) BN, C, AlN, or combinations thereof. That is, solid-phase fillers may be in the form of particles, whiskers, fibers, or other particles, in which surfaces are coated with an interfacial coating.

At least some of the solid-phase fillers may be chemically bonded to the silicon-containing monomers. At least some of the solid-phase fillers may contain a surface treatment that increases the compatibility, solubility, and/or bonding reactivity of the solid-phase fillers with the silicon-containing monomers. For example, the solid-phase fillers may contain one or more surface-functional groups selected from the group consisting of silane, methoxy silane, ethoxy silane, vinyl, ethynyl, vinyl ether, vinyl ester, vinyl amide, vinyl triazine, vinyl isocyanurate, acrylate, methacrylate, diene, triene, mercapto, thiol, oxirane, oxetane, and combinations, analogues, or derivatives thereof.

In some embodiments, the composition further comprises a reactive or non-reactive surfactant and/or a reactive or non-reactive wetting agent.

At least some of the solid-phase fillers may be coated with a UV-reflective material, such as a UV-reflective material selected from the group consisting of Al, Ni, Sn, Ag, Rh, Au, and combinations or alloys thereof.

At least some of the solid-phase fillers may be coated with a protective material that inhibits degradation of the solid-phase fillers during high-temperature pyrolysis.

At least some of the solid-phase fillers may be coated with a sacrificial material that selectively degrades, thereby inhibiting degradation of the solid-phase fillers during high-temperature pyrolysis.

Other variations of the invention provide a 3D-printing composition comprising:

(a) from about 10 vol % to about 99 vol % of one or more preceramic monomers in a liquid phase; and (b) from about 1 vol % to about 70 vol % of solid-phase fillers, wherein the solid-phase fillers contain one or more surface-functional groups selected from the group consisting of silane, methoxy silane, ethoxy silane, vinyl, ethynyl, vinyl ether, vinyl ester, vinyl amide, vinyl triazine, vinyl isocyanurate, acrylate, methacrylate, diene, triene, mercapto, thiol, oxirane, oxetane, and combinations, analogues, or derivatives thereof.

In some embodiments, the preceramic monomers are UV-curable monomers selected from the group consisting of silazanes, siloxanes, silanes, and combinations, analogues, or derivatives thereof.

In some embodiments, the preceramic monomers are non-UV-curable monomers, wherein the surface-functional groups react with the preceramic monomers when exposed to UV radiation.

The solid-phase fillers may be selected from the group consisting of SiOC, SiCN, SiC, SiCBN, SiOCN, SiAlON, $Si_3N_4$, $SiO_2$, silicate glasses, $Al_2O_3$, $ZrO_2$, $TiO_2$, carbon, TiC, ZrC, HfC, $Y_3Al_5O_{12}$, $B_4C$, BN, TiN, ZrN, AlN, and combinations thereof.

In certain embodiments, at least some of the surface-functional groups are attached to silane compounds that are in turn attached to the solid-phase fillers.

In some embodiments, the surface-functional groups, when exposed to UV radiation or visible light, react with the preceramic monomers.

The solid-phase fillers may be in the form of fibers, whiskers, nanotubes, nanorods, flat platelets, microparticles with average diameter from 1 micron to 100 microns, nanoparticles with average diameter from 1 nanometer to 1000 nanometers, or combinations thereof. Alternatively, or additionally, the solid-phase fillers may be in the form of fibers with average length from 1 micron to 100 microns and with average diameter that is less than 10% of the average length, wherein the solid-phase fillers are selected from the subgroup consisting of $Si_3N_4$, $Al_2O_3$, $SiO_2$, BN, $Y_3Al_5O_{12}$, $ZrO_2$, and combinations thereof.

In some embodiments, least some of the solid-phase fillers are coated with a protective material that inhibits degradation of the solid-phase fillers during high-temperature pyrolysis, wherein the protective material is disposed between the surface-functional groups and the surface of the solid-phase fillers.

In some embodiments, at least some of the solid-phase fillers are coated with a sacrificial material that selectively degrades, thereby inhibiting degradation of the solid-phase fillers during high-temperature pyrolysis, wherein the sacrificial material is disposed between the surface-functional groups and the surface of the solid-phase fillers.

In certain embodiments, the solid-phase fillers are in the form of fibers with average length from 1 micron to 100 microns and with average diameter that is less than 10% of the average length, wherein the solid-phase fillers are coated with an interfacial coating selected from BN, C, AlN, or combinations thereof, and wherein the interfacial coating is disposed between the surface-functional groups and the surface of the solid-phase fillers.

Some embodiments provide a ceramic matrix composite comprising a pyrolyzed form of a 3D-printed, UV-cured composition(s) as described above.

Other variations provide a method of making a ceramic matrix composite, the method comprising:

(i) obtaining a 3D-printing composition;

(ii) 3D-printing and polymerizing the 3D-printing composition to generate a preceramic polymer; and (iii) thermally treating the preceramic polymer to produce a ceramic matrix composite, wherein the 3D-printing composition comprises:

(a) from about 10 vol % to about 99.9 vol % of one or more preceramic, UV-curable, silicon-containing monomers; and (b) from about 1 vol % to about 70 vol % of solid-phase fillers, wherein the solid-phase fillers are selected from the group consisting of SiOC, $SiO_2$, SiCN, SiC, SiCBN, SiOCN, SiAlON, $Si_3N_4$, $SiO_2$, silicate glasses, $Al_2O_3$, $ZrO_2$, $TiO_2$, carbon, TiC, ZrC, HfC, $Y_3Al_5O_{12}$, $B_4C$, BN, TiN, ZrN, AlN, and combinations thereof.

Other variations provide a method of making a ceramic matrix composite, the method comprising:

(i) obtaining a 3D-printing composition;

(ii) 3D-printing and polymerizing the 3D-printing composition to generate a preceramic polymer; and (iii) thermally treating the preceramic polymer to produce a ceramic matrix composite, wherein the 3D-printing composition comprises:

(a) from about 10 vol % to about 99.9 vol % of one or more preceramic monomers; and (b) from about 1 vol % to about 70 vol % of solid-phase fillers, wherein the solid-phase fillers contain one or more surface-functional groups selected from the group consisting of silane, vinyl, ethynyl, vinyl ether, vinyl ester, vinyl amide, vinyl triazine, vinyl isocyanurate, acrylate, methacrylate, diene, triene, and combinations, analogues, or derivatives thereof.

In other variations of the present invention, a preceramic monomer formulation is provided for 3D-printing and (typically UV-initiated) cationic polymerization, the monomer formulation comprising:

(a) a monomer molecule containing (i) non-carbon atoms, such as (but not limited to) atoms selected from the group consisting of Si, B, Al, Ti, Zn, P, S, Ge, and combinations thereof, and (ii) two or more functional groups selected from the group consisting of aliphatic ether, cyclic ether, vinyl ether, epoxide, cycloaliphatic epoxide, oxetane, and combinations, analogues, or derivatives thereof;

(b) a cationic photoinitiator or photoacid generator that may (in some embodiments) generate a Brønsted acid when exposed to light; and (c) a 3D-printing resolution agent selected from the group consisting of UV or visible-light absorbers, fluorescent molecules, optical brighteners, and combinations thereof.

The formulation may contain more than one type of the monomer molecule. In some embodiments, at least 10% or at least 40% (on an atom basis) of the non-carbon atoms is Si.

In some embodiments, the cationic photoinitiator or photoacid generator is present in a concentration from about 0.001 wt % to about 10 wt % in the formulation. The formulation may include a photoacid generator that cleaves when exposed to light to generate a Brønsted acid. The formulation may alternatively or additionally include an ionic photoacid generator or a non-ionic photoacid generator.

In some embodiments, the formulation comprises or further comprises a thermal cationic initiator.

In some embodiments, the formulation comprises a cationic photoinitiator that is active at a first wavelength, as well as a radiation-trigger Brønsted acid generator that is active at a second wavelength substantially different from the first wavelength (i.e., the cationic photoinitiator active wavelength).

The 3D-printing resolution agent may be present in a concentration from about 0.001 wt % to about 10 wt % in the formulation. The 3D-printing resolution agent may be selected from the group consisting of 2-(2-hydroxyphenyl)-benzotriazole, 2-hydroxyphenyl-benzophenones, 2-hydroxyphenyl-s-triazines, thiophenediyl)bis(5-tert-butylbenzoxazole), 2,2'-(1,2-ethenediyl)bis(4,1-phenylene) bisbenzoxazole, and combinations thereof.

In some embodiments, the formulation further comprises a UV sensitizer that forms an excited state under UV light absorption.

In preferred embodiments, the formulation further comprises from about 0.1 vol % or about 1 vol % to about 70 vol % of solid-phase fillers.

Other variations provide a preceramic monomer formulation for 3D-printing and (typically UV-initiated) free-radical polymerization, the monomer formulation comprising:

(a) a monomer molecule containing (i) non-carbon atoms that are optionally selected from the group consisting of Si, B, Al, Ti, Zn, P, S, Ge, N, O, and combinations thereof, and (ii) two or more C=X double bonds, two or more C≡X triple bonds, or at least one C=X double bond and at least one C≡X triple bond, wherein X is selected from C, S, N, O, or a combination thereof;

(b) a photoinitiator that generates free radicals when exposed to light;

(c) a free-radical inhibitor; and (d) a 3D-printing resolution agent selected from the group consisting of UV absorbers, fluorescent molecules, optical brighteners, and combinations thereof.

In some embodiments, at least one of the C=X double bonds or the C≡X triple bonds is located at a terminal position of the monomer molecule.

The monomer molecule may include two or more functional groups selected from the group consisting of vinyl, ethynyl, vinyl ether, vinyl ester, vinyl amide, vinyl triazine, vinyl isocyanurate, acrylate, methacrylate, diene, triene, and combinations, analogues, or derivatives thereof. Alternatively, or additionally, the monomer molecule may contain an alkyl group, an ester group, an amine group, a hydroxyl group, or a combination thereof.

In some embodiments, the non-carbon atoms are selected from the group consisting of Si, B, Al, Ti, Zn, P, S, Ge, and combinations thereof. In these or other embodiments, X is selected from C, S, or a combination thereof.

In some embodiments, at least 10 wt % of the monomer molecule is inorganic. In some embodiments, at least 10% (on an atom basis) of the non-carbon atoms is Si.

In some embodiments, the photoinitiator is present in a concentration from about 0.001 wt % to about 10 wt % in the formulation. In certain embodiments, the photoinitiator generates free radicals by intramolecular bond cleavage or intermolecular hydrogen abstraction when exposed to light having a wavelength from about 200 nm to about 500 nm. The photoinitiator may be selected from the group consisting of 2,2-dimethoxy-2-phenylacetophenone, 2-hydroxy-2-methylpropiophenone, camphorquinone, bis(2,4,6-trimethylbenzoyl)-phenylphosphineoxide, benzophenone, benzoyl peroxide, and combinations thereof.

In some embodiments, the formulation further comprises a thermal free-radical initiator, such as one selected from the group consisting of benzoyl peroxide, dicumyl peroxide, 2,2'-azobisisobutyronitrile, and combinations thereof, for example.

In certain embodiments, the formulation further includes a radiation-trigger free-radical initiator active at a wavelength substantially different from the photoinitiator active wavelength (i.e. the primary 3D-printing wavelength).

The free-radical inhibitor may present in a concentration from about 0.001 wt % to about 10 wt % in the formulation. The free-radical inhibitor may be selected from the group consisting of hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, and combinations thereof, for example.

The 3D-printing resolution agent may be present in a concentration from about 0.001 wt % to about 10 wt % in the formulation. The 3D-printing resolution agent may be selected from the group consisting of 2-(2-hydroxyphenyl)-benzotriazole, 2-hydroxyphenyl-benzophenones, 2-hydroxyphenyl-s-triazines, thiophenediyl)bis(5-tert-butylbenzoxazole), 2,2'-(1,2-ethenediyl)bis(4,1-phenylene)bisbenzoxazole, and combinations thereof.

Preferred formulations herein further include about 1 vol % to about 70 vol % of solid-phase fillers.

Some embodiments provide a ceramic structure comprising a pyrolyzed form of a 3D-printed, UV-cured composition as described.

Other variations provide a method of making a ceramic structure, the method comprising:

(i) obtaining a preceramic monomer formulation;

(ii) 3D-printing and polymerizing the preceramic resin formulation to generate a preceramic polymer; and (iii) thermally treating the preceramic polymer to produce a ceramic structure, wherein the preceramic resin formulation comprises:

(a) a monomer molecule containing (i) non-carbon atoms selected from the group consisting of Si, B, Al, Ti, Zn, P, S, Ge, and combinations thereof, and (ii) two or more functional groups selected from the group consisting of aliphatic ethers, cyclic ether, vinyl ether, epoxide, cycloaliphatic epoxide, oxetane, and combinations, analogues, or derivatives thereof;

(b) a cationic photoinitiator or photoacid generator that may generate a Brønsted acid when exposed to light; and (c) a 3D-printing resolution agent selected from the group consisting of UV absorbers, fluorescent molecules, optical brighteners, and combinations thereof.

Other variations provide a method of making a ceramic structure, the method comprising:

(i) obtaining a preceramic monomer formulation;

(ii) 3D-printing and polymerizing the preceramic resin formulation to generate a preceramic polymer; and (iii) thermally treating the preceramic polymer to produce a ceramic structure, wherein the preceramic resin formulation comprises:

(a) a monomer molecule containing (i) non-carbon atoms selected from the group consisting of Si, B, Al, Ti, Zn, P, S, Ge, N, O, and combinations thereof, and (ii) two or more C=X double bonds, two or more C≡X triple bonds, or at least one C=X double bond and at least one C≡X triple bond, wherein X is selected from C, S, N, O, or a combination thereof;

(b) a photoinitiator that generates free radicals when exposed to light;

(c) a free-radical inhibitor; and (d) a 3D-printing resolution agent selected from the group consisting of UV absorbers, fluorescent molecules, optical brighteners, and combinations thereof.

Still other variations of the present invention provide a 3D-printing composition comprising:

(a) from about 10 vol % to about 99 vol % of one or more preceramic, UV-curable monomers (typically in a liquid phase); and (b) from about 1 vol % or about 1 vol % to about 70 vol % of solid-phase functional additives, wherein the functional additives have at least one average dimension from about 5 nanometers to about 50 microns, and wherein the functional additives are characterized in that when heated, the functional additives are reactive with the monomers to cause an increase in volume of the composition.

In some embodiments, when the functional additives are heated, they are reactive with the monomers. In these or other embodiments, the functional additives are characterized in that when heated under a heating atmosphere, the functional additives are reactive with one or more gases (e.g., $O_2$ and/or $N_2$) contained in the heating atmosphere.

In some embodiments, the preceramic, UV-curable monomers are selected from unsaturated ethers, vinyls, acrylates, methacrylates, cyclic ethers (epoxies or oxetanes), thiols, or a combination thereof. In other embodiments, the preceramic, UV-curable monomers are selected from silazanes, siloxanes, silanes, carbosilanes, or a combination thereof.

In some embodiments, the preceramic, UV-curable monomers contain (i) non-carbon atoms selected from the group consisting of Si, B, Al, Ti, Zn, P, S, Ge, and combinations thereof, and (ii) two or more functional groups selected from the group consisting of aliphatic ethers, cyclic ether, vinyl ether, epoxide, cycloaliphatic epoxide, oxetane, and combinations, analogues, or derivatives thereof.

In some embodiments, the preceramic, UV-curable monomers contain (i) non-carbon atoms selected from the group consisting of Si, B, Al, Ti, Zn, P, S, Ge, N, O, and combinations thereof, and (ii) two or more C=X double bonds, two or more C≡X triple bonds, or at least one C=X double bond and at least one C≡X triple bond, wherein X is selected from C, S, N, O, or a combination thereof.

The functional additives may be selected from the group consisting of scandium, yttrium, titanium, zirconium, hafnium, vanadium, niobium, tantalum, chromium, molybdenum, tungsten, manganese, iron, cobalt, nickel, zinc, boron, aluminum, gallium, silicon, germanium, phosphorus, and combinations, alloys, oxides, carbides, or nitrides thereof. In these or other embodiments, the functional additives may be selected from the group consisting of titanium silicide, chromium silicide, magnesium silicide, zirconium silicide, molybdenum silicide, and combinations or silicates thereof. In certain embodiments, the functional additives are selected from the group consisting of aluminum, titanium, zirconium, titanium silicide, chromium silicide, magnesium silicide, zirconium silicide, and combinations thereof.

Other variations provide a method of making a ceramic structure, the method comprising:

(i) obtaining a 3D-printing composition comprising (a) from about 10 vol % to about 99 vol % of one or more preceramic, UV-curable monomers; and (b) from about 1 vol % to about 70 vol % of solid-phase functional additives, wherein the functional additives have at least one average dimension from about 5 nanometers to about 50 microns, and wherein the functional additives are characterized in that when heated, the functional additives are reactive with the monomers to cause an increase in volume of the composition;

(ii) 3D-printing and polymerizing the 3D-printing composition to generate a preceramic polymer; and (iii) thermally treating the preceramic polymer to produce a ceramic structure, wherein during the thermally treating, the functional additives react with the monomers to cause an increase in volume, or reduce volumetric shrinkage, of the ceramic structure compared to a ceramic structure that does not contain the functional additives.

Other variations provide a 3D-printing composition comprising:

(a) from about 10 vol % to about 99 vol % of one or more preceramic, UV-curable monomers, wherein at least some of the preceramic, UV-curable monomers contain thiol groups; and (b) from about 1 vol % to about 70 vol % of solid-phase functional additives, wherein the functional additives have at least one average dimension from about 5 nanometers to about 50 microns, and wherein the functional additives are characterized in that when heated, the functional additives reactively bind with sulfur contained in the thiol groups of the monomers.

The functional additives may be selected from the group consisting of scandium, yttrium, titanium, zirconium, hafnium, vanadium, niobium, tantalum, chromium, molybdenum, tungsten, manganese, iron, cobalt, nickel, zinc, boron, aluminum, gallium, silicon, germanium, phosphorus, and combinations, alloys, oxides, carbides, or nitrides thereof. In certain embodiments, the functional additives are selected from the group consisting of titanium, zirconium, hafnium, silicon, aluminum, chromium, niobium, chromium silicide, titanium silicide, and combinations thereof.

A ceramic structure is provided, comprising a pyrolyzed form of a 3D-printed, UV-cured composition as disclosed. In some embodiments, the ceramic structure contains sulfur in a concentration from about 0.01 wt % to about 30 wt % on an elemental sulfur basis. For example, the ceramic structure may contain sulfur in a concentration from about 0.1 wt % to about 10 wt % on an elemental sulfur basis.

Other variations provide a method of making a ceramic structure, the method comprising:

(i) obtaining a 3D-printing composition comprising (a) from about 10 vol % to about 99 vol % of one or more preceramic, UV-curable monomers, wherein at least some of the preceramic, UV-curable monomers contain thiol groups; and (b) from about 1 vol % to about 70 vol % of solid-phase functional additives, wherein the functional additives have at least one average dimension from about 5 nanometers to about 50 microns, and wherein the functional additives are characterized in that when heated, the functional additives reactively bind with sulfur contained in the thiol groups of the monomers;

(ii) 3D-printing and polymerizing the 3D-printing composition to generate a preceramic polymer; and (iii) thermally treating the preceramic polymer to produce a ceramic structure, wherein during the thermally treating, the functional additives reactively bind with the sulfur contained in the thiol groups.

Other variations provide a 3D-printing composition comprising:

(a) from about 10 vol % to about 99 vol % of one or more preceramic, UV-curable monomers, preferably in a liquid phase; and (b) from about 1 vol % to about 70 vol % of solid-phase functional additives, wherein the functional additives have at least one average dimension from about 5 nanometers to about 50 microns, and wherein the functional additives are characterized in that when heated, the functional additives catalyze nucleation and/or crystallization associated with conversion of the monomers into a solid ceramic phase.

In some embodiments, the preceramic, UV-curable monomers are selected from unsaturated ethers, vinyls, acrylates, methacrylates, cyclic ethers (epoxies or oxetanes), thiols, or a combination thereof. In other embodiments, the preceramic, UV-curable monomers are selected from silazanes, siloxanes, silanes, or a combination thereof.

The preceramic, UV-curable monomers may contain (i) non-carbon atoms selected from the group consisting of Si, B, Al, Ti, Zn, P, S, Ge, and combinations thereof, and (ii) two or more functional groups selected from the group consisting of aliphatic ethers, cyclic ether, vinyl ether, epoxide, cycloaliphatic epoxide, oxetane, and combinations, analogues, or derivatives thereof.

In some embodiments, the preceramic, UV-curable monomers contain (i) non-carbon atoms selected from the group consisting of Si, B, Al, Ti, Zn, P, S, Ge, N, O, and combinations thereof, and (ii) two or more C=X double bonds, two or more C≡X triple bonds, or at least one C=X double bond and at least one C≡X triple bond, wherein X is selected from C, S, N, O, or a combination thereof.

In certain embodiments, the preceramic, UV-curable monomers consist of or contain carbosilanes, wherein the functional additives consist of or contain silicon carbide (optionally as β-SiC).

In certain embodiments, the preceramic, UV-curable monomers consist of or contain silazanes and/or polysesquiazanes, wherein the functional additives consist of or contain silicon nitride (optionally as α-$Si_3N_4$ and/or β-$Si_3N_4$) and/or contain silicon carbide (optionally as β-SiC), or a combination thereof.

A ceramic structure is provided, comprising a pyrolyzed form of a 3D-printed, UV-cured composition as disclosed.

Other variations provide a method of making a ceramic structure, the method comprising:

(i) obtaining a 3D-printing composition comprising (a) from about 10 vol % to about 99 vol % of one or more preceramic, UV-curable monomers; and (b) from about 1 vol % to about 70 vol % of solid-phase functional additives, wherein the functional additives have at least one average dimension from about 5 nanometers to about 50 microns, and wherein the functional additives are characterized in that when heated, the functional additives catalyze nucleation and/or crystallization associated with conversion of the monomers into a solid ceramic phase;

(ii) 3D-printing and polymerizing the 3D-printing composition to generate a preceramic polymer; and (iii) thermally treating the preceramic polymer to produce a ceramic structure, wherein during the thermally treating, the functional additives catalyze nucleation and/or crystallization of a solid ceramic phase in the ceramic structure.

In various embodiments of the invention, the functional additives are in the form of fibers, whiskers, nanotubes, nanorods, flat platelets, microparticles with average diameter from 1 micron to 100 microns, nanoparticles with average diameter from 1 nanometer to 1000 nanometers, or combinations thereof. In certain embodiments, the functional additives are in the form of fibers with average length from 1 micron to 100 microns and with average diameter that is less than 10% of the average length.

In various embodiments, the functional additives are coated with one or more compounds or chemical groups that polymerize or crosslink the monomer when exposed to UV radiation and/or heat. The compounds or chemical groups may be selected from the group consisting of unsaturated ethers, vinyls, acrylates, methacrylates, cyclic ethers (epoxies or oxetanes), and combinations thereof.

In various embodiments, the functional additives are covalently bonded to one or more compounds or chemical groups selected from the group consisting of unsaturated ethers, vinyls, acrylates, methacrylates, cyclic ethers, epoxies, oxetanes, amines, hydroxyls, isocyanates, hydrides, thiols, and combinations thereof.

In various embodiments, at least some of the functional additives contain a surface treatment that increases the compatibility, solubility, and/or bonding reactivity of the functional additives with the monomers. For example, at least some of the functional additives may be surface-treated with silane compounds.

In various embodiments, the composition further comprises a reactive or non-reactive surfactant and/or a reactive or non-reactive wetting agent.

In various embodiments, the functional additives are at least partially transparent to UV light. Alternatively, or additionally, the functional additives may be at least partially reflective of UV light.

DETAILED DESCRIPTION OF EMBODIMENTS OF THE INVENTION

Figure 1A:
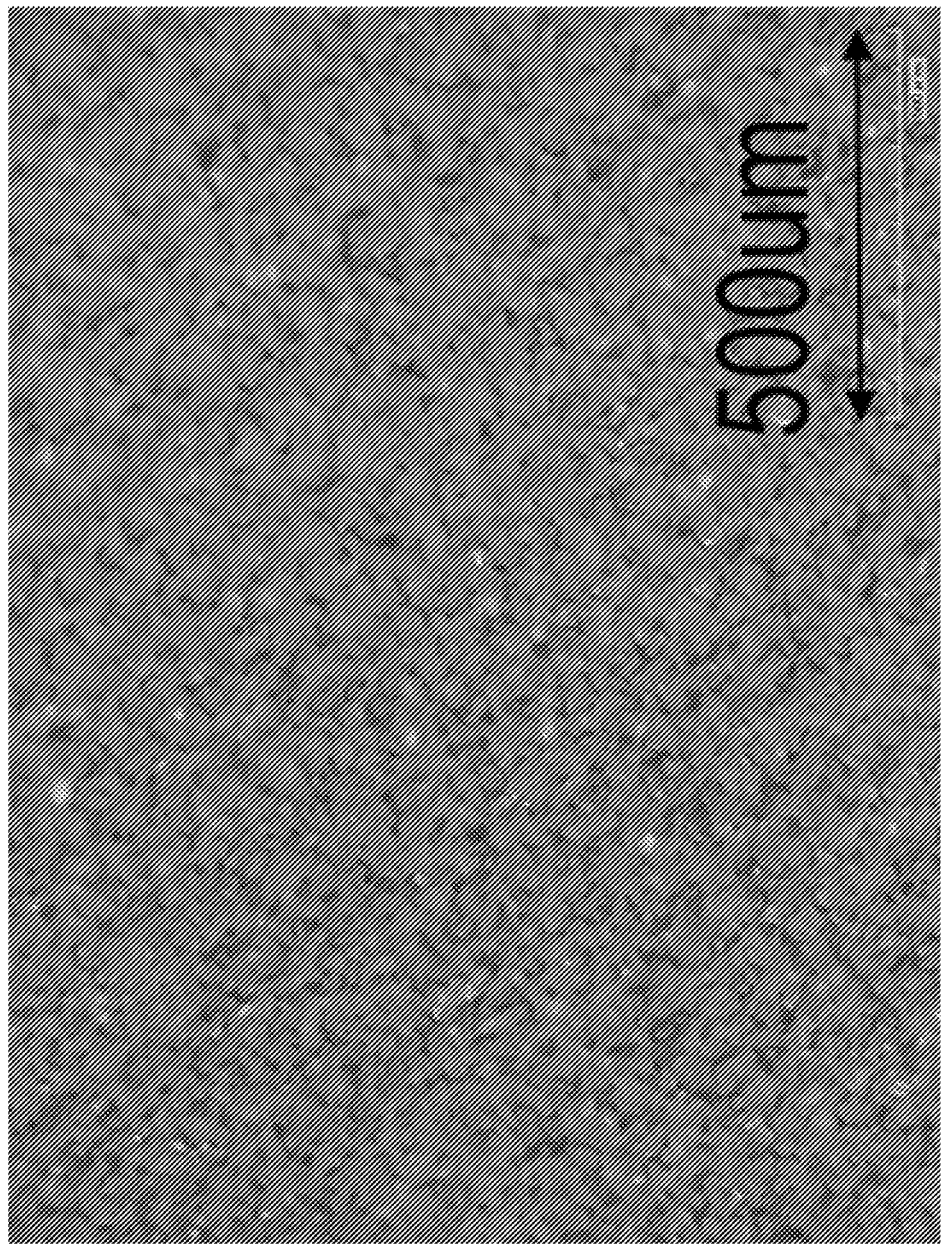
FIG. 1A is an optical microscope image of SiC solid-phase fillers dispersed in a preceramic silicone monomer (scale bar 500 μm), in Example 1.

The compositions (also referred to as formulations), structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

Variations of this invention provide resin formulations which may be used for 3D printing (e.g., by stereolithography) of an intermediate structure followed by thermally treating (e.g., by firing or pyrolyzing) to convert the 3D intermediate structure into a 3D ceramic structure. The monomers and polymeric systems can be printed into potentially complex 3D shapes with high thermal stability and mechanical strength.

"Preceramic" in this disclosure simply refers to the capability to be ultimately converted to a ceramic material. It is noted that the disclosed preceramic resin formulations are precursors to preceramic polymers, which themselves are precursors to ceramic materials. As intended herein, a "resin" means a composition capable of being polymerized or cured, further polymerized or cured, or crosslinked. Resins may include monomers, oligomers, prepolymers, or mixtures thereof.

The extremely high melting point of many ceramics poses a challenge to additive manufacturing to make a 3D part, as compared with metals and polymers. Ceramics cannot be cast or machined easily. By contrast, the present methods enable geometrical flexibility. As described herein, preceramic resins that are cured with ultraviolet (UV) light in a stereolithography 3D printer or through a patterned mask, for example, form 1D, 2D, or 3D polymer structures that can have complex shape and cellular architecture. These polymer structures can then be thermally converted to the corresponding 1D, 2D, or 3D ceramic part, preferably with low shrinkage, or at least uniform shrinkage.

Some variations of the invention are premised on direct, free-form 3D printing of a preceramic polymer loaded with a solid-phase filler, followed by converting the preceramic polymer to a 3D-printed ceramic matrix composite. The monomers and polymeric systems are selected with specific properties so that they can be printed using 3D-printing methods including stereolithography into complex 3D shapes. Some embodiments provide free-form ceramic matrix composite parts containing UV-cured, 3D-printed (e.g., stereolithographically), solid-filled preceramic Si-containing polymer resins, or related monomer formulations. As used herein, "polymer resin" means monomer, oligomer, prepolymer, or other molecule that is converted to a polymer.

The preceramic monomer formulations are designed to allow the ceramic structures to be formed with preferably high thermal stability (such as chemical and physical stability at temperatures greater than 1500° C.) and good mechanical strength (including stiffness, flexural strength, hardness, and/or fracture toughness). The solid solid-phase filler, among other benefits, can improve mechanical properties, especially the fracture toughness of the (otherwise) brittle ceramic material.

The invention in various embodiments applies to additively manufactured components, such as to reduce part count, scrap, or non-recurring engineering. Some embodiments apply to high-wear or high-temperature applications that would necessitate ceramic materials. Specific applications of interest include, for example, propulsion structures (vanes, impellors, nacelles, and thrusters), control surfaces (fins and leading edges), hypersonic structures (thermal protection systems and heat shields), high-wear components (brakes, clutches, and rotors), catalyst support structures, pump components, filters, brakes, and clutches.

This disclosure describes resin formulation families and methods for 3D printing of preceramic polymer parts with solid solid-phase fillers, and then firing or pyrolyzing the part into a ceramic. The ceramic materials may be prepared from a wide variety of preceramic monomer formulations that can be used in UV-cure-based 3D printing. Stereolithography, laser rastering, digital light processing, liquid crystal device projection, or other techniques may be employed to 3D print the monomer formulations.

The preceramic monomer formulations are loaded with a dissimilar solid material, or multiple solid materials, as solid-phase fillers to form polymer composite parts that can be directly converted to ceramic matrix composites (CMCs) via pyrolysis or other thermal treatment. The solid-phase fillers may include fibers, whiskers, platelets, particles, nanoparticles, nanotubes, or other forms of materials which can at least partially survive the pyrolysis conditions. Exemplary solid-phase fillers include, but are not limited to, carbides, oxides, nitrides, or carbon (such as diamond). Certain exemplary solid-phase fillers include, but are not limited to, SiC, C, $Al_2O_3$, $SiO_2$, mullite ($Al_2O_3$—$SiO_2$), $Si_3N_4$, SiAlON, BN, and/or YAG ($Y_3Al_5O_{12}$).

Following pyrolysis, the ceramic material comprises interconnected three-dimensional ceramic matrix materials such as, but not limited to, silicon oxycarbide (SiOC), silicon carbide (SiC), silicon nitride ($Si_3N_4$), silicon oxynitride (SiON), silicon oxycarbonitride (SiOCN), silicon carbonitride (SiCN), silicon boronitride (SiBN), silicon boron carbonitride (SiBCN), and/or boron nitride (BN).

In some variations, a monomer formulation is a mixture of a liquid preceramic monomer resin and a solid solid-phase filler. The liquid resin is preferably UV-curable to enable definition of three-dimensional shapes via a 3D-printing process.

Note that in this disclosure, all references to "UV," "UV-curable," "UV-cure-based" and the like shall include reference not only to ultraviolet radiation but also other electromagnetic radiation bands that can be effective in various embodiments, including microwave radiation, terahertz radiation, infrared radiation, visible radiation (light), ultraviolet radiation, and X-rays.

In some embodiments, the UV-curable monomer formulation comprises a first molecule containing two or more unsaturated C=X double bonds or C≡X triple bonds (or at least one C=X double bond and at least one C≡X triple bond). X is selected from C, S, O, N, or a combination thereof, so these functional groups include C=C double bond, C≡C triple bond, C=S, and C≡N. Any H atoms involved in these functional groups may be substituted with other atoms such as F or Cl, or side groups such as alkyl, ester, amine, hydroxyl, or CN. The first molecule may contain different combinations of these different unsaturated bonds. Typical unsaturated bonds are C=C double bonds at the terminal position of the molecules, in which three hydrogen atoms are bonded to carbon atoms on the C=C bonds (i.e., R—HC=$CH_2$ where R is the remainder of the first molecule). Other examples of these functional groups include vinyl, ethynyl, vinyl ether, vinyl ester, vinyl amide, vinyl triazine, vinyl isocyanurate, acrylate, methacrylate, diene, triene, or a mixture thereof.

The first molecule also contains at least one non-carbon atom in the main chain or side chains of the first molecule. Examples of non-carbon atoms that may be used include, but are not limited to, Si, B, Al, Ti, Zn, O, N, P, S, Ge, and combinations thereof. The non-carbon atoms may be a part of cyclic or acyclic groups or structures within the first molecule. The non-carbon atoms are preferably not merely single non-carbon atoms ionically bonded at the end(s) of the first molecule. In some embodiments, when X is O, the non-carbon atom is not O; or when X is N, the non-carbon atom is not N.

Examples of the first molecules include, but are not limited to, trivinylborazine; 2,4,6-trimethyl-2,4,6-trivinyl-cyclotrisilazane; 1,3,5,7-tetravinyl-1,3,5,7-tetramethylcyclotetrasilazane; 1,3,5-trivinyl-1,3,5-trimethylcyclosiloxane; 1,3,5,7-tetravinyl-1,3,5,7-tetramethylcyclotetrasiloxane; 2,2,4,4,6,6-hexakisallyloxyl-triazatriphosphinine; tetraallyloxysilane; vinyl-terminated polydimethylsiloxane; tetravinylsilane; vinyl-terminated polydimethylsiloxane-ethylene copolymer; divinyldimethylsilane; 1,2-divinyltetramethyldisilane; 1,4-bis(vinyldimethylsilyl)benzene; vinylmethylsiloxane homopolymer; methacryloxypropyl-terminated polydimethylsiloxane; boron vinyldimethylsiloxide; vinylmethylsiloxane-dimethylsiloxane copolymer, trimethylsiloxy-terminated homopolymer; vinylethoxysiloxane-propylethoxysiloxane copolymer; vinyltrimethoxysilane; trivinylmethylsilane; diallyldimethylsilane; 1,3,5-trisilacyclohexane; B,B'B"-trithynyl-N,N'N"-trimethylborazine; B,B'B"-triethynylborazine; vinylmethoxysiloxane, acryloxypropyl(methylsiloxane) homopolymer; or a combination thereof.

The first molecule, when present, may be up to about 100 wt % of the monomer formulation. In various embodiments, the first molecule is about 5, 10, 20, 30, 40, 50, 60, 70, 80, 90, or 95 wt % of the monomer formulation.

In some embodiments, the UV-curable monomer formulation comprises a second molecule with a structure R—Y—H, wherein Y=O, S, N, or combinations thereof. The molecules R—Y—H can provide two or more YH groups for polymerization, and can be part of cyclic or acyclic structures. Typical YH groups are SH groups, e.g. thiol or mercapto groups. The R groups can be organic groups such as alkyl groups, ester groups, amine groups, or hydroxyl groups, or inorganic non-carbon-containing atoms or groups. Examples of inorganic non-carbon atoms or groups in the second molecule include, but are not limited to, Si, B, Al, Ti, Zn, P, Ge, S, O, N, or combinations thereof. The reaction rate varies depending on the different molecules utilized. In some preferred embodiments, a thiol is employed with at least half of the main chain made of inorganic atoms, such as silicon. Other atoms in the main chain may include oxygen, nitrogen, and/or carbon.

The second molecule, when present, may be up to about 97 wt % of the monomer formulation. In various embodiments, the second molecule is about 0, 5, 10, 20, 30, 40, 50, 60, 70, 80, or 90 wt % of the monomer formulation. The second molecule may be present whether or not the first molecule is present.

Exemplary second molecule include, but are not limited to, pentaerythritol tetrakis(3-mercaptopropionate); trimethylolpropanetris(2-mercaptoacetate); trimethylolpropane tris (3-mercaptopropionate); tetrakis(dimethyl-3-mercaptopropylsiloxy)silane; tetrakis(dimethyl-2-mercaptoacetate siloxy)silane; (mercaptopropyl)methylsiloxane-dimethylsiloxane copolymer; (mercaptopropyl)methylsiloxane homopolymer; pentaerythritol tetrakis(2-mercaptoacetate); or a combination thereof.

In some embodiments, the UV-curable monomer formulation comprises a third molecule with a structure R—Y, wherein Y is selected from an aliphatic ether, a cyclic ether, a vinyl ether, an epoxy, a cycloaliphatic epoxy, an oxetane group, or a combination thereof. The R groups may be selected from organic groups such as alkyl groups, ester groups, amine groups, or hydroxyl groups, or inorganic non-carbon containing atoms or groups. Examples of inorganic non-carbon atoms or groups in the second molecule include, but are not limited to, Si, B, Al, Ti, Zn, P, Ge, S, O, N, or combinations thereof. The inorganic non-carbon atoms or groups may be a part of cyclic or acyclic structures.

Exemplary third molecules include, but are not limited to, epoxy-functional dimethylpolysiloxane and/or epoxycyclohexylethyl methylsiloxane/dimethylsiloxane. These monomers can be any portion of the monomer formulation.

In particular, the third molecule, when present, may be up to about 100 wt % of the monomer formulation. In various embodiments, the third molecule is about 5, 10, 20, 30, 40, 50, 60, 70, 80, 90, or 95 wt % of the monomer formulation. The third molecule may be present whether or not the first or second molecules are present.

In some embodiments, the UV-curable monomer formulation comprises a photoinitiator that generates free radicals under light exposure by intramolecular bond cleavage or intermolecular hydrogen abstraction. The photoinitiator may be active in the presence of light having a wavelength from about 200 nm to about 500 nm, for example. Photoinitiators may be used when the polymerization is, or includes, free-radical polymerization. Photoinitiators may be used to initiate polymerization when exposed to other wavelengths, such as in the visible spectrum. In certain embodiments, light exposure is produced from light having one or more wavelengths selected from about 200 nm to about 700 nm, such as about 250, 300, 350, 400, 500, or 600 nm.

Different photoinitiators will generally result in different reaction rates for polymerization. A combination of different types of photoinitiators may be used in the polymerization process. More than one photoinitiator may be included to allow multi-wavelength curing, for example.

Examples of photoinitiators include, but are not limited to, 2,2-dimethoxy-2-phenylacetophenone; 2-hydroxy-2-methylpropiophenone; camphorquinone; bis(2,4,6-trimethylbenzoyl)-phenylphosphineoxide; benzophenone; benzoyl peroxide; thioxanones; dicumyl peroxide; 2,2'-azobisisobutyronitrile; camphorquinone; oxygen; nitrogen dioxide; or a combination thereof.

The photoinitiator, when present, may be up to about 10 wt % of the monomer formulation. In various embodiments, the photoinitiator is about 0.001, 0.005, 0.01, 0.05, 0.1, 0.5, 1, 2, 5, or 10 wt % of the monomer formulation.

In some embodiments, the UV-curable monomer formulation comprises a free-radical inhibitor added in a sufficient amount to the monomer formulation to inhibit unwanted polymerization of regions outside the desired printing area. A free-radical inhibitor can improve resolution to the desired part in embodiments that employee free-radical polymerization. A free-radical inhibitor can also deter shadow curing, which is normally not desired. Additionally, a free-radical inhibitor can improve long-term stability of the formulation and keep reaction kinetic parameters constant over time.

Exemplary free-radical inhibitors include, but are not limited to, hydroquinone, methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, or a combination thereof. When present, the free-radical inhibitor may be up to about 5 wt % of the monomer formulation, such as about 0.001, 0.005, 0.01, 0.05, 0.1, 0.2, 0.5, 1, or 2 wt % of the monomer formulation.

Optionally the formulation further includes a radiation-trigger free-radical initiator that is active at a wavelength substantially different from the photoinitiator. When the preceramic resin formulation includes a thermal free-radical initiator, optionally the formulation further includes a radiation-trigger free-radical initiator.

In some embodiments, the UV-curable monomer formulation comprises a free-radical thermal initiator that generates free radicals under elevated temperature conditions. The addition of a free-radical thermal initiator allows for multiple-mechanism curing in the formulation, i.e., both UV curing and thermal curing, or allows for a different polymerization reaction rate. One or a combination of different types of thermal initiators may be used in the polymerization process.

A thermal initiator may be used to crosslink unreacted vinyl groups remaining which have not reacted with the thiol group or to react the vinyl group with other available functional groups such as methyl or hydro groups on the first or second molecule, creating a second type of reaction mechanism. A thermal post-cure after 3D printing may be done, such as by heating the polymer structure up to 300° C.

Exemplary free-radical thermal initiators include, but are not limited to, benzoyl peroxide, dicumyl peroxide, 2,2'-azobisisobutyronitrile, or a combination thereof. When present, the free-radical thermal initiator may be up to about 10 wt % of the monomer formulation, such as about 0.001, 0.01, 0.1, 1, 2, or 5 wt % of the monomer formulation.

In some embodiments, the UV-curable monomer formulation comprises a cationic photoinitiator or photoacid generator, such as (but not limited to) sulphonium, iodonium, and/or ferrocenium cation paired with a non-nucleophilic anion. For example, the UV-curable resin may contain a salt which under light exposure creates acids (e.g., Brønsted acids) by cleavage of the sulphonium, iodonium, and/or ferrocenium cation of the onium salt, paired with a proton donor. Cationic photoinitiators are typically active under light wavelengths from 200 nm to 350 nm. Initiators that are active at lower or higher wavelengths are also applicable to these monomer formulations. Cationic photoinitiators or ionic photoacid generators may be used when the polymerization is, or includes, cationic polymerization. Different cationic photoinitiators or photoacid generators will generally result in different reaction rates for polymerization. A combination of different types of cationic photoinitiators and/or photoacid generators (including ionic and non-ionic photoacid generators) may be used in the polymerization process.

Exemplary cationic photoinitiators or photoacid generators include, but are not limited to, sulfonium, iodonium, and ferrocenium salts; cyclopentacienylcumene-iron hexafluoro phosphate; diphenyliodonium phosphate; triarylsulfonium hexafluoroantimonate; or a combination thereof.

The cationic photoinitiator or photoacid generator, when present, may be up to about 10 wt % of the monomer formulation. In various embodiments, the cationic photoinitiator or photoacid generator is about 0.001, 0.005, 0.01, 0.05, 0.1, 0.5, 1, 2, 5, or 10 wt % of the monomer formulation.

In certain embodiments, the UV-curable monomer formulation comprises a hydrogen donor that may be used to assist in the generation of a Brønsted acid in the cation or in acceleration of anionic photoinitiator reactions, for example. Exemplary hydrogen donors include, but are not limited to, tertiary amines, alcohols, ethers, esters, water, or a combination thereof. When present, the hydrogen donor may be up to about 2 wt % of the monomer formulation, such as about 0.001, 0.005, 0.01, 0.05, 0.1, 0.5, 1, or 1.5 wt % of the monomer formulation.

In some embodiments, the UV-curable monomer formulation comprises a UV sensitizer that may be used to enable the long-UV-wavelength reaction of UV systems with photoinitiators which typically absorb at lower wavelengths. This is typically the case with cationic photoinitiators, which are generally limited to absorption up to about 325-375 nm, for example. UV sensitizers interact with UV light at higher wavelengths, generally into the 375-425 nm range, and then interact with the photoinitiator to create either free radicals and/or Brønsted acids. A UV sensitizer forms an excited triplet state under UV light absorption, and then via electron or energy transfer, reacts with a photoinitiator to generate free radicals and/or Brønsted acids. This initiates photopolymerizaton.

UV sensitizers may be selected from dibutoxyantracene, diethoxyanthracene, 1-chloro-4-propoxythioxanthone, 2-isopropylthioxanthone, 4-isopropylthioxanthone, or a combination thereof, for example. When present, the UV sensitizer may be up to about 5 wt % of the monomer formulation, such as about 0.001, 0.005, 0.01, 0.05, 0.1, 0.5, 1, 2, 3, or 4 wt % of the monomer formulation.

In some embodiments, including those utilizing free-radical polymerization, cationic polymerization, or both of these, the UV-curable monomer formulation comprises one or more 3D-printing resolution agents selected from UV absorbers, fluorescents, optical brighteners, or a combination thereof.

A "3D-printing resolution agent" is a compound that improves print quality and resolution by containing the curing to a desired region of the laser or light exposure. In certain embodiments, the 3D-printing resolution agent functions by absorbing light (e.g., UV or visible light) at a desired wavelength and converting the energy either into thermal energy or radiation at a higher wavelength. The use of 3D-printing resolution agents improves print quality and resolution by containing the curing by the laser or light exposure to the desired region laterally and/or vertically in the print bath.

Exemplary 3D-printing resolution agents include, but are not limited to, 2-(2-hydroxyphenyl)-benzotriazole; 2-hydroxyphenyl-benzophenones; 2-hydroxyphenyl-s-triazines; 2,2'-(2,5-thiophenediyl)bis(5-tert-butylbenzoxazole); ethenediyl)bis(4,1-phenylene)bisbenzoxazole; or a combination thereof. When present, the 3D-printing resolution agent may be up to about 10 wt % of the monomer formulation, such as about 0.001, 0.01, 0.1, 0.5, 1, 2, 3, 4, 5, 6, 7, 8, or 9 wt % of the monomer formulation.

Some variations provide a preceramic resin formulation comprising:

(a) a first molecule comprising two or more C=X double bonds, two or more C≡X triple bonds, or at least one C=X double bond and at least one C≡X triple bond, wherein X is selected from the group consisting of C, S, N, O, and combinations thereof, and wherein the first molecule further comprises at least one non-carbon atom selected from the group consisting of Si, B, Al, Ti, Zn, P, Ge, S, N, O, and combinations thereof;

(b) optionally a second molecule comprising R—Y—H, wherein R is an organic group or an inorganic group, and wherein Y is selected from the group consisting of S, N, O, and combinations thereof (Y is not yttrium in this specification);

(c) a photoinitiator and optionally a thermal free-radical initiator;

(d) a free-radical inhibitor; and (e) a 3D-printing resolution agent.

In some embodiments, the first molecule is present from about 3 wt % to about 97 wt % of the formulation, such as about 4, 5, 10, 15, 20, 25, 30, 35, 40, 45, 50, 55, 60, 65, 70, 75, 80, 85, 90, or 95 wt %, for example.

In some embodiments, the first molecule contains two or more C=X double bonds, and at least one of these double bonds is located at a terminal position of the first molecule. In some embodiments, the first molecule contains two or more C≡X triple bonds, and at least one of these triple bonds is located at a terminal position of the first molecule. In some embodiments, the first molecule contains at least one C=X double bond and at least one C≡X triple bond, and the C=X double bond is located at a terminal position, or the C≡X triple bond is located at a terminal position, or both of the C=X double bond and the C≡X triple bond are located at (different) terminal positions within the first molecule. Note that a molecule may contain more than two terminal positions, when there is branching present.

In the first molecule, the non-carbon atom may be present in the main chain, in side chains, or in both of these.

The first molecule may include one or more functional groups selected from the group consisting of vinyl, ethynyl, vinyl ether, vinyl ester, vinyl amide, vinyl triazine, vinyl isocyanurate, acrylate, methacrylate, diene, triene, and analogues thereof. In some embodiments, the first molecule includes two or more of such functional groups. An "analogue" herein means that the functional group has similar chemical and reactive properties, with respect to the polymerization of the preceramic resin formulation.

In some embodiments in which the second molecule is included in the preceramic resin formulation, the second molecule is present from about 0.1 wt % to about 97 wt % of the formulation, such as about 0.2, 0.5, 1, 2, 3, 4, 5, 10, 15, 20, 25, 30, 35, 40, 45, 50, 55, 60, 65, 70, 75, 80, 85, 90, or 95 wt %, for example.

The second molecule may include one or more functional groups selected from the group consisting of thiol, alkyl, ester, amine, hydroxyl, and functional analogs thereof. Alternatively, or additionally, the second molecule may be chemically contained within one or more functional groups selected from the group consisting of thiol, alkyl, ester, amine, hydroxyl, and analogues thereof.

When the second molecule is present, the R group may be, or include, an inorganic group containing an element selected from the group consisting of Si, B, Al, Ti, Zn, P, Ge, S, N, O, and combinations thereof.

In some embodiments, at least 5%, 10%, 15%, 20%, 25%, 30%, 35%, 40%, 45%, or 50% (mole percent) of the R group is inorganic, i.e. not carbon. In certain embodiments, at least 5%, 10%, 15%, 20%, 25%, 30%, 35%, 40%, 45%, or 50% (mole percent) of the R group is specifically Si.

In the second molecule, the R group may be present in the main chain, in side chains, or in both of these. The non-carbon atom of the R group, when it is inorganic, may be the same as or different than the non-carbon atom in the first molecule.

The weight ratio of the second molecule to the first molecule may vary from about 0 to about 32, such as about 0.5, 1, 2, 3, 5, 10, 15, 20, 25, or 30. In some embodiments, the weight ratio of second molecule to first molecule is dependent on the ratio of thiol to vinyl. For example, in certain embodiments there is at least one thiol functional group available per vinyl group.

As noted earlier, some variations of the invention employ a combination of free-radical polymerization and cationic polymerization. In some embodiments, a preceramic monomer formulation compatible with stereolithography or UV-cure 3D printing leverages both cationic and free-radical polymerization mechanisms, wherein the formulation comprises:

(a) a first molecule comprising two or more C=X double bonds or C≡X triple bonds, wherein X is selected from C and/or S, or from C, S, O, and/or N, and wherein the first molecule further comprises at least one non-carbon atom in the main chain or side chains selected from the group consisting of Si, B, Al, Ti, Zn, P, S, Ge, and combinations thereof;

(b) a second molecule comprising two or more thiol or mercapto (SH) groups, wherein the second molecule further comprises at least one non-carbon atom in the main chain or side chains selected from the group consisting of Si, B, Al, Ti, Zn, P, S Ge, and combinations thereof (preferably at least 10 wt %, more preferably at least 40 wt %, of the non-carbon atoms being inorganic, such as Si), and wherein the second molecule may be a part of an alkyl group, ester group, amine group, or hydroxy group;

(c) a third molecule comprising two or more functional groups selected from aliphatic ether, cyclic ether, vinyl ether, epoxy, cycloaliphatic epoxy, oxcetane, or a combination thereof, wherein the third molecule further contains at least one non-carbon atom in the main chain or side chains selected from the group consisting of Si, B, Al, Ti, Zn, P, S, Ge, and combinations thereof;

(d) a photoinitiator that generates free radicals by intramolecular bond cleavage and/or intermolecular hydrogen abstraction under exposure to light having a wavelength from about 200 nm to about 500 nm;

(e) a cationic photoinitiator or photoacid generator that may generate Brønsted acids under a light exposure;

(f) a free-radical inhibitor, wherein the free-radical inhibitor is added in a sufficient amount to the monomer formulation to inhibit unwanted polymerization of regions outside the desired exposure and deter shadow curing;

(g) UV absorbers, fluorescents, and/or optical brighteners added in a sufficient amount to the monomer formulation to improve print quality and resolution by containing the curing to the region of the laser or light exposure to the desired region;

(h) optionally a UV sensitizer to enable the long-UV-wavelength reaction of UV systems with photoinitiators that typically absorb at lower wavelengths, forming an excited triplet state under UV light absorption, followed by electron or energy transfer to react with a photoinitiator to generate free radicals and/or Brønsted acids, thereby initiating photopolymerizaton; and (i) optionally from about 0.1 vol % to about 70 vol % of one or more solid-phase fillers as set forth herein.

In preferred embodiments, the UV-curable monomer formulation further comprises one or more solid-phase fillers. A "solid-phase filler" as meant herein is a material that (a) forms at least one solid phase at 25° C. and 1 atm, and (b) enhances at least one chemical, physical, mechanical, or electrical property within the UV-curable monomer formulation or a reaction product thereof. A solid-phase filler is not merely a low-cost, diluent material (known also as extenders) but rather an important component of some formulations disclosed herein.

The solid-phase filler may be from about 0.1 vol % or about 1 vol % to about 70 vol % of the monomer formulation, with the majority of the remainder typically being liquid-phase UV-curable monomer.

The geometric shape of the solid-phase filler may be fibers including short fibers (1-100 micrometers in length) or long fibers (>100 micrometers in length), whiskers, nanotubes, nanorods, flat platelets, microparticles with diameters between 1 and 100 micrometers, nanoparticles with diameters between 1 and 1000 nanometers, or a combination thereof.

To increase fracture toughness of a 3D-printed part, solid-phase fillers with aspect ratios of at least 2 are preferred, such as fibers, whiskers, nanotubes, and nanorods. Here, "aspect ratio" is the ratio of average length to average width, or in the case of an arbitrary shape, the ratio of average maximum length scale to average minimum length scale. The solid-phase filler aspect ratio is preferably at least 5, more preferably at least 10, in certain embodiments.

The solid-phase filler composition is preferably stable at a pyrolysis temperature of at least 800° C., so as not to disintegrate, melt, or vaporize during later conversion of a preceramic polymer to a ceramic material. Note that the solid-phase filler may react at pyrolysis temperatures with other components present in the monomer formulation or its reaction products (e.g., polymer) or with furnace atmosphere gases. It is possible for a portion of the solid-phase filler to react away into the vapor phase, or into a liquid phase, during high-temperature processing.

In certain embodiments, a solid-phase filler precursor is introduced to the monomer formulation, wherein the precursor is in a liquid phase or is a gel, for example. The solid-phase filler precursor may then react or undergo a phase change, such as during polymerization, to convert the solid-phase filler precursor into a solid-phase filler.

The solid-phase filler may have a wide range of compositions. For example, solid-phase filler compositions may include, but are not limited to, silicon-based ceramics such as $SiOC$, $SiO_2$, $SiCN$, $SiC$, $SiCBN$, $SiOCN$, $Si_3N_4$, silicate glasses, etc. Solid-phase filler compositions may include non-silicon-based ceramics such as metal oxides, e.g. $Al_2O_3$, $ZrO_2$, $TiO_2$, or $Y_3Al_5O_{12}$. Solid-phase filler compositions may include carbon-based, high-temperature materials such as carbon, graphene, diamond, and metal carbides, e.g. TiC, ZrC, HfC, or $B_4C$. Solid-phase filler compositions may include nitride-based ceramics, e.g. BN, TiN, ZrN, or AlN.

Solid-phase fillers interact with UV light according to Snell's law and the well-known Fresnel equations. These laws of physics determine the fractions of the light that are reflected, transmitted, or absorbed when UV light passes from resin to filler. For a UV-based 3D printing process, it is preferred that the fillers do not absorb too much UV light which would hinder complete UV curing of the resin. To avoid absorption of too much UV light, a low level of solid-phase filler may be employed, such as less than 10 vol % of relatively small (e.g., 10 micron or smaller) particles. Alternatively, or additionally, a solid-phase filler that is somewhat transparent to UV light and lets UV light pass through, may be employed. Another approach to ensure that UV light is not excessively absorbed by the filler particles is to employ particles with a surface that reflects UV light. For example, aluminum reflects UV light well. For maximum reflection, the surface of such particle should be smooth. Surface treatments or coatings may be applied to render the surface of filler particles reflective—such as a thin coating of aluminum or silver.

Preferred solid-phase filler materials, in some embodiments, are short fibers of alumina ($Al_2O_3$), quartz ($SiO_2$), glass, silicon nitride ($Si_3N_4$), yttrium aluminum garnet (YAG), or boron nitride (BN) because these materials transmit at least some UV light. SiC or C fibers absorb too much UV light and therefore should to be coated with a reflective coating, to enable efficient 3D printing.

Depending on the chemistry and viscosity of the monomer formulation (resin), the solid-phase filler may be treated to increase its compatibility with and wetting of the resin, the solubility and dispersion of the filler in the resin, and/or the bonding between the filler and the resin. In some embodiments, dispersion aides may be chosen to match the isoelectric point of the solid-phase filler particle and the chemistry and functionality of the monomer resin.

Some embodiments employ surfactants with a component which bonds to the surface of the filler and a component which solvates in the resin system. Surface functionality may be added to the surface of the solid-phase filler by covalently bonding a functional group to the surface of the filler. Examples include the use of silane surface modifiers with active groups that can either react with the chemistry of the resin or increase the wettability and dispersability in the solid-phase filler. These include the addition of mercapto trimethoxy silane, vinyl trimethoxy silane, 3-glycidyl oxypropyl trimethoxy silane, or a combination thereof, for example. The surface may also be modified through other chemical means, such as vapor-solid reactions or liquid-solid reactions, e.g. oxidation in a furnace or acid or base treatments.

For the 3D printing and curing of the resin, it can also be advantageous if the solid-phase filler itself is coated or surface-treated with a chemical that contains a functional group that aids in polymerization or crosslinking of the resin on UV and/or thermal exposure. Such functional groups include unsaturated ethers, vinyls, acrylates, methacrylates, cyclic ethers, epoxies, oxetanes, amines, hydroxyls, isocyanates, hydrides, or combinations thereof. By adding functional groups to the surface of the solid-phase filler, fewer or even no functional groups are necessary in the resin and the system can still be cured by UV exposure. Alternatively, or additionally, functional groups introduced to the surface of the solid-phase filler particles may enable a thermal cure after initial UV curing during 3D printing.

The solid-phase filler may be coated to protect it from environmental degradation during pyrolysis. Reactive species such as oxygen free radicals, and other free radicals, may be generated during the pyrolysis. Such free radicals can react with the fillers and degrade their properties. To mitigate this, the fillers may be coated with a thin layer of a protective material such as BN or a sacrificial material such as pyrolytic carbon that preferentially decomposes during pyrolysis.

To increase fracture toughness of a 3D-printed ceramic matrix composite, a high-aspect-ratio filler, such as a fiber, may be coated with a filler/matrix interfacial coating. The purpose of this coating is to provide a weak filler—matrix interface that prevents matrix cracks from penetrating the fillers—thus providing damage tolerance (toughness) to the composite. The interfacial coating is preferably chemically and mechanically stable during processing and pyrolysis. Examples of interfacial coatings include BN, C, AlN, or a combination thereof.

The formulations disclosed herein may be 3D printed using many different methods. In some variations, the formulations may be directly 3D printed and converted to free-form ceramic matrix composite structures. A 3D-printed preceramic polymer material may be prepared directly from preceramic monomer formulations, with no intervening steps being necessary. A 3D-printed ceramic material may then be prepared directly from the 3D-printed preceramic polymer material, with no intervening steps being necessary.

Preferred methods may include stereolithography, binder jetting, resin jetting with fiber placement, polyjetting, extrusion printing, or a combination thereof.

In stereolithography, the solid-phase filler is dispersed in the liquid resin (monomer formulation). Layers are cured from the top or bottom using UV-laser rastering, projection micro-stereolithography, digital light projection, or liquid crystal device projection, for example. Smaller filler sizes are preferred since the filler size often limits the resolution, depending on material choice.

Generally speaking, "jetting" of a material means that droplets of a build material are selectively deposited onto a build bed to develop a three-dimensional object. Jetting can be carried out by liquid deposition, vapor deposition, or liquid-vapor mist deposition, for example, via spraying (such as via a nozzle in communication with a material under pressure), impingement (such as via a tube or pipe in communication with a material that is pumped), or other means.

In binder jetting, a layer of the solid-phase filler is spread out and resin (monomer formulation) is jetted on selected locations and cured such as via UV light or thermally. This process is similar to conventional binder jetting methods, but instead of a binder, a preceramic monomer formulation is used. The solid-phase filler may initially be spread out on a substrate or on a region of polymer based on the selected monomer, for example. After an initial step of binder jetting, another layer of the solid-phase filler may be spread out on a 3D-printed polymer layer, followed by resin jetting and curing. This process may be repeated many times for large parts.

In resin jetting with fiber placement, solid-phase fillers in the form of long or short fibers are placed in the preferred location and aligned in the preferred direction. Subsequently, preceramic resin (monomer formulation) is jetted in selected locations and cured. The process is repeated layer-by-layer to build a part. Resin jetting with fiber placement enables printing of parts with high volume fraction (such as 30-60 vol %) of aligned fibers, resulting in improved mechanical properties for the final ceramic structure (following pyrolysis).

In polyjetting, a mixture of liquid resin (monomer formulation) and solid-phase filler is jetted and written into the desired pattern. As the mixture is dispensed, it is exposed to UV light such as a laser, LED, or plasma sources, and cured into a polymer. Multiple mixtures are able to be dispensed through different nozzles, allowing for more than one type of monomer-filler mixture to be utilized simultaneously. This results in tailored mechanical properties for the final ceramic structure (following pyrolysis).

In extrusion printing, the resin and filler mixture is squeezed through a micro-nozzle, or multiple micro-nozzles, and cured via UV light. One advantage is that high-aspect-ratio fillers can be aligned with the extrusion process. Alignment generally improves mechanical properties in the aligned direction.

After a part is 3D printed using any of the above methods, or another method, the part may be post-cured. An optional thermal post-cure of the 3D polymer is performed after the 3D printing but prior to the pyrolysis to produce the ceramic structure. A post-cure step may be employed to crosslink unreacted functional groups, for example. Post-curing may be accomplished by additional UV exposure and/or a thermal post-cure at elevated temperatures (such as 60-500° C.) in an oven for about 10 minutes to about 8 hours. When a thermal post-cure is to be done, it can be beneficial to include a thermal initiator in the initial 3D-printing composition, to facilitate later thermal curing.

Typically, but not necessarily, a monomer formulation is conveyed (printed) to a region of interest, such as via stereolithography, binder jetting, resin jetting with fiber placement, polyjetting, or extrusion printing, either followed by polymerization or with polymerization taking place simultaneously with the printing. Preferably, the polymerizing and 3D printing steps are performed simultaneously, at a desired location (e.g., a layer) within a part. In some embodiments, the polymerizing and 3D printing steps are performed semi-simultaneously, in which multiple steps are performed overall while at each step, some amount of polymerizing and some amount of 3D printing takes place. It is also possible, in some embodiments, to first polymerize a preceramic resin formulation, followed by 3D printing of the already-made polymer—especially when the polymer is a thermoplastic material.

In some embodiments, the curing or conversion of preceramic resin formulation to preceramic polymer includes crosslinking. A crosslink is a bond that links one polymer chain to another. Crosslink bonds can be covalent bonds or ionic bonds. When polymer chains are linked together by crosslinks, they lose some of their ability to move as individual polymer chains. Crosslinks are the characteristic property of thermosetting plastic materials. In most cases, crosslinking is irreversible, unless ionic bonds are employed in reversible crosslinks (see, for example, commonly owned U.S. patent application Ser. No. 15/391,749, filed Dec. 27, 2016, which is hereby incorporated by reference herein).

In some embodiments, while a monomer is being converted to polymer, a gel is formed first. Gel formation is followed by formation of a solid material as the monomer conversion is further increased, to crosslink chains together. A "gel" is a solid, jelly-like material that can have properties ranging from soft and weak to hard and tough. Gels exhibit no flow when in the steady-state. By weight, gels are mostly liquid, yet they behave like solids due to a three-dimensional crosslinked network within the liquid.

Some variations of the invention utilize a self-propagating polymer waveguide, as described in commonly owned U.S. Pat. No. 7,687,132 issued Mar. 30, 2010 to Gross et al.; U.S. Pat. No. 9,341,775 issued May 17, 2016 to Eckel et al.; U.S. Pat. No. 9,377,567 issued Jun. 28, 2016 to Jacobsen et al.; and U.S. Pat. No. 9,528,776 issued Dec. 27, 2016 to Roper et al., which are hereby incorporated by reference herein. Without being limited by speculation or theory, it is hypothesized that initial exposure of monomer to a collimated beam can initiate microgel sites within the liquid monomer layer. These microgel sites have a higher crosslink density than the surrounding monomer/polymer, which leads to a higher localized refractive index. The higher refractive index at the microgel site may act as a lens. The focused energy from the incident beam leads to initial "waveguide" formation in the direction of the incident (primary) beam, where the refractive index of the waveguide is higher than the surrounding monomer/polymer. U.S. Pat. No. 7,382,959 issued Jun. 3, 2008 to Jacobsen is hereby incorporated by reference herein for its description of mechanisms involving self-propagating polymer waveguide formation.

In exemplary embodiments, sufficient polymerization inhibitor and UV absorber are added to the resin formulation to confine the polymerization to the laser exposure point and to minimize scatter, thus maintaining fidelity in the features of the printed part. UV light is then scanned across the resin surface to expose a cross section and build up a thin slice of the part to be manufactured. Although in principle any geometry can be fabricated with this approach, the process can be slow, because every thin layer has to be exposed separately.

Structures with linear features extending from the exposure surface, such as lattices and honeycombs, can be formed much more rapidly when utilizing the self-propagating photopolymer waveguide technology. Monomers are selected to promote a change in the index of refraction upon polymerization, which causes internal reflection of the UV light, trapping it in the already-formed polymer. This exploits a self-focusing effect that forms a polymer waveguide, tunneling the light toward the tip of the waveguide and causing it to polymerize further. There is a reduced need for additives that control scatter and UV absorption. The architecture of the material or structure can then be defined by a patterned mask that defines the areas exposed to a collimated UV light source, for example. The polymer crosslink density depends on exposure parameters and can be increased by thermal treatments or additional UV exposure. Unpolymerized resin may be recycled and reused.

The direct, near-net-shape conversion of a preceramic 3D-printed polymer to a ceramic structure may be achieved by pyrolysis or other thermal treatment, such as (but not limited to) sintering, annealing, or calcination. Typically, the thermal treatment is based on heating the 3D-printed structure for an extended period of time (such as from 10 minutes to 1 week) under various inert or reactive atmospheres.

Thermal treatment may be done for an extended period of time under various atmospheres, including but not limited to $N_2$, Ar, He, air, $CO_2$, $CH_4$, $C_2H_6$, $C_2H_4$, $NH_3$, or a combination thereof. Treatment pressures may vary from about 1 atm to about 20 atm, for example. Vacuum pyrolysis may also be employed, in which the treatment pressure is less than 1 atm, again under various atmospheres as noted above.

The pyrolysis or other thermal treatment may include heating at a heating rate of 0.1-20° C./min from ambient temperature to an elevated temperature from about 500° C. to about 1500° C., such as from about 800° C. to about 1100° C. These slow heating rates are preferred to enable evolving gases to escape, thereby minimizing porosity in the final part. When porosity is desired, higher heating rates (e.g., higher than 20° C./min) may be employed. The pyrolysis or other thermal treatment may also include dwelling at the elevated temperature (e.g., 950° C.) for at least 1, 5, 10, 15, 30, or 60 minutes. Following pyrolysis, the material may be cooled at a cooling rate (magnitude) of 0.1-20° C./min back to ambient temperature. In some embodiments, faster cooling (e.g., higher than 20° C./min in magnitude) is desired to freeze-in a desired microstructure, for example.

The thermal treatment is preferably performed following polymerization and any (optional) thermal post-cure of the 3D polymer. In certain embodiments, the thermal treatment is combined (i.e., overlaps in time and/or temperature) with polymerization, thermal post-cure, or both. It will also be recognized that even when a sequential operation is intended, some amount of ceramic formation may occur prior to a planned step of thermal treatment, as a result of the intrinsic kinetics and thermodynamics of the reaction system.

In some embodiments, a reactive thermal treatment is performed, in which the gas that is initially present is reactive toward the initial polymer, the final ceramic material, or both of these. When the gas is reactive, it may react with a component and cause it to leave the material. Alternatively, or additionally, the gas may react with a component and remain with the base material. It is also possible for the gas to react and form products, some of which depart from the material while the rest remains with the material. Reactive gases may be selected from $O_2$, $O_3$, air, CO, $CO_2$, $H_2$, $H_2O$, $CH_4$, $SO_2$, $H_2S$, $NH_3$, NO, $NO_2$, and $N_2O$, and so on. The maximum temperature for reactive thermal treatment may be, for example, about 300° C. to about 1500° C. The system pressure may also be adjusted to influence the gas atmosphere.

The pyrolysis or other thermal treatment process produces a ceramic part or ceramic matrix composite which may include various ceramic materials such as, but not limited to, SiC, SiOC, $Si_3N_4$, SiON, SiCN, SiOCN, SiBN, SiBCN, BN, or a combination thereof. The composition of the ceramic part or ceramic matrix composite obviously is directly dependent on the composition of the starting 3D-printing monomer formulation as provided in this disclosure. When carbon is desired in the ceramic material, the fraction of carbon may be tailored, for example, by adding phenyl groups on the side chain of the polymer or by using a carbon-based crosslinking agent such as divinyl benzene.

In some embodiments, final ceramic structures are lightweight, strong, and stiff—but can withstand a high-temperature oxidizing environment. The configuration and microstructure of the preceramic polymer determine the composition, microstructure, and yield of the ceramic material after thermal treatment. A high crosslink density is preferred to prevent the fragmentation and loss of low-molecular-mass species, which have not fully converted to either ceramic or escaping gases, during thermal treatment.

During the thermal treatment, whether an inert or reactive thermal treatment technique is employed, gases escape. Gases are formed during the conversion of preceramic polymer to the ceramic structure, by decomposition reactions of the polymer, photoinitiator, free-radical inhibitor, and/or 3D-printing resolution agent. The escaping gases or vapors may include (but are by no means limited to) $CH_4$, $H_2$, CO, $CO_2$, $H_2O$, $SO_2$, $H_2S$, $CH_3S$, etc.

Because various gases escape during pyrolysis or other thermal treatment, the concentration of the solid-phase filler will typically be higher in the final ceramic material, compared to the starting 3D-printing monomer formulation. This is because the solid-phase filler is typically very stable during thermal treatment and does not lose much, if any, mass, while the polymer typically loses a significant amount of mass in pyrolysis (for example, see FIG. 3). Therefore, the concentration of solid-phase filler may be greater than 70 vol % in the final ceramic structure. In various embodiments, the concentration of solid-phase filler is from about 0.1 vol % to about 90 vol %, such as about 0.5, 1, 5, 10, 20, 30, 40, 50, 60, 70, or 80 vol % on the basis of the total ceramic structure following thermal treatment and any post-processing (e.g., washing).

In some variations of this invention, active solid-phase functional additives are employed as the solid-phase fillers. By "solid-phase functional additives" it is meant a material that (a) forms at least one solid phase at 25° C. and 1 atm, and (b) performs or enhances at least one chemical, physical, mechanical, or electrical function within the ceramic structure as it is being formed and in the final structure.

Note that solid-phase functional additives are distinguished from the solid-phase fillers disclosed above. Compared to solid-phase fillers, solid-phase functional additives actively improve the final ceramic structure through one or more changes explicitly induced by the additives during pyrolysis or other thermal treatment, as will now be described.

The solid-phase functional additives may be present from about 0.1 vol % and 70 vol % of the monomer formulation, with the majority of the remainder being liquid UV-curable resin. The solid-phase functional additive geometry varies. In some embodiments, the solid-phase functional additives are small particles with average sizes (length or effective diameter) from 5 nanometers to 5 micrometers.

In some embodiments, the solid-phase functional additives actively expand in volume and counteract the shrinkage of the resin, eliminating or reducing the overall shrinkage during conversion of the polymer to ceramic. This addresses a significant shortcoming in the art.

In particular, on conversion from polymer to ceramic, typically about 20-30% linear dimensional shrinkage and about 20-60% mass loss are observed. The shrinkage facilitates cracking and distortion, and limits the achievable part size and tolerances. By introducing active solid-phase functional additives that expand in volume during pyrolysis, the shrinkage of the preceramic polymer is counteracted. The overall shrinkage during conversion of the polymer to ceramic can be reduced or even eliminated.

Note that the solid-phase functional additives are not necessarily stable (unreactive) at pyrolysis temperatures. In many case, it is desired that the functional additives are reactive.

In particular, the solid-phase functional additives may react with the preceramic resin directly on heat treatment. Alternatively, or additionally, the solid-phase functional additives may react with species (e.g., oxygen, nitrogen or carbon) generated from decomposition of the polymer during pyrolysis. Alternatively, or additionally, the solid-phase functional additives may react with the pyrolysis atmosphere during the pyrolysis, for example a nitrogen, methane, or ammonia atmosphere. To counteract the detrimental effects of shrinkage, it is preferred that these reactions happen at the same time as the preceramic resin shrinks, or are effective to reverse the volume reduction.

Examples of solid-phase functional additives for counteracting the shrinkage of the resin include, but are not limited to, scandium, yttrium, titanium, zirconium, hafnium, vanadium, niobium, tantalum, chromium, molybdenum, tungsten, manganese, iron, cobalt, nickel, zinc, boron, aluminum, gallium, silicon, germanium, phosphorus, or combinations thereof. Combinations of these elements such as titanium silicide, chromium silicide, magnesium silicide, zirconium silicide, or molybdenum silicide may be used as the solid-phase functional additives. Preferred solid-phase functional additives in this category include aluminum, titanium, zirconium, titanium silicide, chromium silicide, magnesium silicide, and zirconium silicide.

In some embodiments, the solid-phase functional additives actively bind sulfur. For example, the solid-phase functional additives may react with sulfur from thiol groups in the resin and bind the sulfur into stable compounds. One class of preferred UV-curable preceramic resins for 3D printing is based on the thiol-ene reaction (alkene hydrothiolation). The thiol groups contain sulfur which can partially remain in the ceramic after pyrolysis, causing an unpleasant smell. Residual sulfur can also corrode metals.

To mitigate the negative effects of residual sulfur, active solid-phase functional additives may be added that react with the sulfur and bind the sulfur in stable compounds that are neutral in smell and neutral with respect to corrosion of metals. Examples of solid-phase functional additives for binding with sulfur include, but are not limited to, Ti, Zr, Hf, Si, Al, Cr, Nb, $CrSi_2$, $TiSi_2$, or a combination thereof. Preferred sulfur gathering/scavenging solid-phase functional additives are Ti, Zr, and Hf which react to form the stable compounds $Ti_2S_3$, $ZrS_2$, and $HfS_2$, respectively.

In some embodiments, the ceramic structure contains from about 0.01 wt % to about 20 wt % sulfur, such as from about 0.1 wt % to about 10 wt % sulfur. In various embodiments, the ceramic structure contains about 0.1, 0.2, 0.5, 1, 2, 3, 4, 5, 6, 7, 8, 9, 10, 11, 12, 13, 14, or 15 wt % sulfur. Of the sulfur that is present, from about 10 wt % to about 100 wt %, such as about 20, 30, 40, 50, 60, 70, 80, or 90 wt %, may be bound to solid-phase functional additives in stable compounds containing sulfur.

In some embodiments, the solid-phase functional additives actively seed crystallization of a preferred ceramic phase by enabling epitaxial growth of the preferred phase without a nucleation barrier. After pyrolysis of preceramic polymers, an amorphous ceramic is usually obtained. To increase strength and hardness, and reduce high-temperature creep, the amorphous ceramic material needs to then be crystallized into a preferred ceramic phase. This is typically achieved by a long (many hours) heat treatment at temperatures above the pyrolysis temperature, performed right after the pyrolysis or as a distinct second heat treatment.

By contrast, with appropriate solid-phase functional additives in the resin, crystallization may be facilitated by seeding crystallization. Without limitation, the mechanism may include providing a surface for epitaxial growth of the preferred phase or multiple ceramic phases.

For example, the crystallization of β-SiC in an amorphous SiC or SiCN ceramic derived from a polycarbosilane-based or polysilazane-based resin can be facilitated by small (e.g., 1 nanometer to 5 microns) β-SiC crystals. Crystallization of such a resin may be performed at temperatures between 1300° C. and 2800° C. over the course of 5 to 50 hours. Similarly, the crystallization of the α phase or β phase of $Si_3N_4$ in an amorphous $Si_3N_4$ or SiCN ceramic derived from a polysilazane-based resin can be facilitated by small (e.g., 50 nanometers to 5 microns) α-$Si_3N_4$ or β-$Si_3N_4$ crystals, respectively. Other crystals may be chosen to facilitate crystallization, with the typical constraint of epitaxial growth on one crystal facet with low lattice strain.

The ceramic structure may be characterized by at least 50% theoretical density, preferably at least 75% theoretical density, and more preferably at least 95% theoretical density. By "theoretical density" it is meant the actual density of the ceramic structure as a percentage of theoretical density of the material itself, calculated in the absence of porous voids. For example a ceramic structure with absolute density of 2.0 $g/cm^3$, fabricated from a base material with inherent (bulk) density of 2.1 $g/cm^3$, exhibits a theoretical density of 2.0/2.1=95%.

In various embodiments, the ceramic structure is characterized by a theoretical density of about (or at least about) 50%, 60%, 70%, 75%, 80%, 85%, 90%, or 95%. In certain embodiments, without limitation, the ceramic structure is a fully dense monolith, which means that the ceramic structure has at least 99% (e.g., essentially 100%) theoretical density associated with a part or continuous region of material (also referred to as a "monolith"). The absolute density in $g/cm^3$ will vary, depending on the selection of base materials; an exemplary range is about 1 $g/cm^3$ to about 4 $g/cm^3$.

The overall mass loss associated with the conversion of preceramic polymer to the ceramic structure may vary widely, such as from about 1 wt % to about 90 wt %, e.g. about 5, 10, 20, 30, 40, 50, 60, 70, or 80 wt %. The overall mass loss will be dictated by the starting formulation (e.g., fraction organic versus inorganic) as well as by process parameters. In principle, the lost mass may be recovered separately and used for other purposes.

Associated with mass loss may be shrinkage of the preceramic polymer as it converts to the ceramic structure. The linear shrinkage (calculated in a single dimension, such as height of part) may be from 0% to about 60%, for example. Note that the mass loss and shrinkage are not necessarily correlated. In some embodiments with high mass loss, there is not much (if any) shrinkage. These embodiments tend to produce higher porosity and therefore lower densities. In some embodiments with high mass loss, there is substantial shrinkage, unless certain solid-phase fillers are utilized as described above and/or solid-phase functional additives are utilized as described below. These embodiments tend to produce lower porosity, or no porosity, and therefore higher densities (e.g., fully dense ceramic materials). Finally, in some embodiments, there is little mass loss but shrinkage associated with chemical reactions taking place. These embodiments also tend to produce relatively high densities.

Despite shrinkage, if any, the bulk shape (relative geometry) of the preceramic 3D-printed polymer may be preserved in the final ceramic structure. That is, when shrinkage is uniform in all dimensions, the geometrical features are retained in the part: it is a scaled-down version, in all three dimensions. In some embodiments, shrinkage is approximately uniform, which means the geometrical features are basically maintained, with slight deviations. Uniform shrinkage is possible when there is no random fragmentation during conversion of the preceramic polymer to the ceramic structure, and when the reactions and gas escape are isotropic within the material. Note that very small features, such as at the nanoscale, may not be preserved during otherwise uniform shrinkage.

Practically speaking, uniform shrinkage (or no shrinkage, in certain embodiments employing active functional additives) enables the formation of parts that are "net shape" or "near net shape." "Net shape" means that the geometrical features are retained, so that manufactured parts allow final fabrication matching the intended design with little or no post-processing. "Near net shape" means that the geometrical features are not perfectly retained but require only minimal post-processing or hand-work. Both net-shape parts and near-net-shape parts require little or no machining, polishing, bonding, surface finishing, or assembly.

The density of the final ceramic part may vary, as explained above. In general (without limitation), absolute densities ranging from about 0.1 g/cm$^3$ to about 5 g/cm$^3$ may be produced. A fully dense ceramic may have a density from about 1 g/cm$^3$ to about 4 g/cm$^3$, for example.

The strength of the final ceramic material will vary, depending on the initial preceramic resin formulation, as well as the processing parameters. In some embodiments, the final ceramic material is characterized by a Young's Modulus of at least about 200 GPa, 300 GPa, 400 GPa, 500 GPa, or more, measured at 25° C. In some embodiments, the final ceramic material is characterized by a flexural strength of at least about 300 GPa, 400 GPa, 500 GPa, or more, measured at 25° C. In some embodiments, the final ceramic material is characterized by a hardness of at least about 10 GPa, 20 GPa, 30 GPa, or more, measured at 25° C.

The engineering strength of a ceramic part also will depend on the geometry—such as a microtruss produced by some embodiments employing a self-propagating polymer waveguide technique. It is noted that, for instance, silicon oxycarbide microlattice and honeycomb cellular materials fabricated with the present methods exhibit higher strength than ceramic foams of similar density.

The thermal stability of the final ceramic material will vary, depending primarily on the initial preceramic resin formulation, as well as the processing parameters. In various embodiments, the final ceramic material is thermally stable at a temperature of at least 1500° C., 1600° C., 1700° C., 1800° C., 1900° C., or 2000° C. Thermal stability means at least that the ceramic material does melt at these temperatures, and preferably also that the ceramic material does not react (e.g., by oxidation or reduction), undergo thermal shock, or physically decompose (introducing defects) at these temperatures. In some embodiments, for example, the ceramic structure is characterized by being stable in the presence of air at a temperature of about 1000° C., 1100° C., 1200° C., 1300° C., 1400° C., 1500° C., 1600° C., 1700° C., 1800° C., or higher.

The final ceramic structure, even when no machining, polishing, bonding, surface finishing, or assembly is required, may be subjected to coloring (e.g., with inks or dyes), stamping, or other non-functional features, if desired.

EXAMPLES

Example 1: Preparation of 3D-Printing Composition for SiC/SiOC UV-Cured Ceramic Matrix Composite A monomer mixture containing 100 parts of vinylmethoxysiloxane polymer, 100 parts of (mercaptopropyl)methylsiloxane polymer, 0.5 parts of 2,2-dimethyl-2-phenylacetophenone, 0.15 parts of tert-butylhydroquinone, and 0.25 parts of 2,2'-(2,5-thiophenediyl)bis(5-tert-butylbenzoxazole) (all parts by weight), is thoroughly blended to make sure the components are well-mixed and the mixture is a uniform system. This resin is capable of forming a silicon oxycarbide (SiOC) ceramic phase when polymerized and thermally treated.

Then 25% by weight silicon carbide (SiC) powder with 50 µm particle size is blended and sonicated to disperse the SiC particles into the above resin. The SiC microparticles serve as solid-phase fillers in the SiOC-forming resin. The mixture is then ready for use as a monomer formulation in UV-cured 3D printing.

Figure 1B:
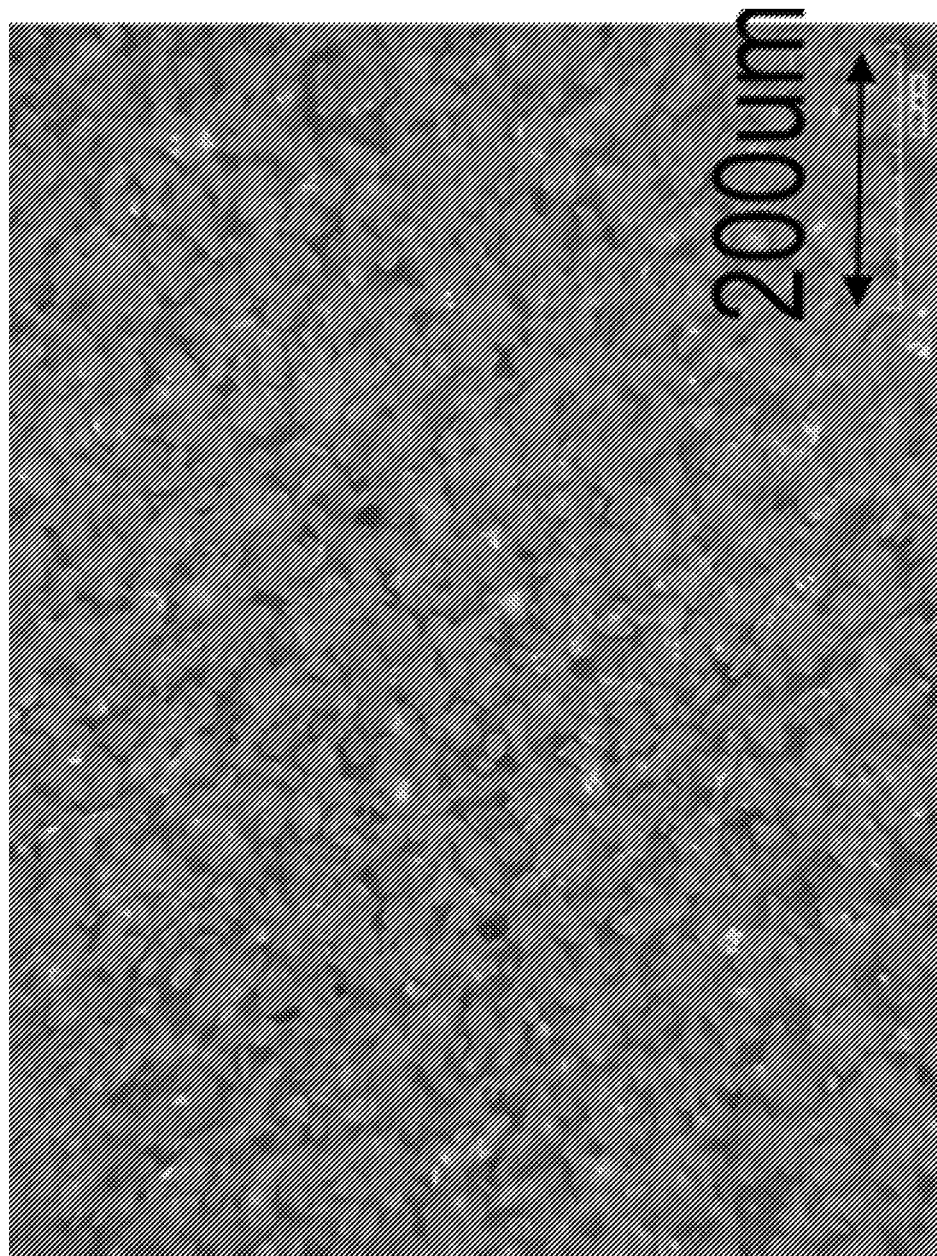
FIG. 1B is an optical microscope image of SiC solid-phase fillers dispersed in a preceramic silicone monomer (scale bar 200 μm), in Example 1.

Optical microscope images of SiC solid-phase fillers dispersed in the preceramic silicone matrix are shown in FIG. 1A (scale bar 500 µm) and FIG. 1B (scale bar 200 µm).

Figure 2:
FIG. 2 is a photograph of a preceramic polymer (right-hand side) and a pyrolyzed ceramic part (left-hand side), in Example 2.

Example 2: Production of 3D-Printed, UV-Cured SiC/SiOC Ceramic Matrix Composite The monomer formulation of Example 1 is 3D-printed and UV-cured, followed by thermal treatment to form a ceramic matrix composite. Bulk parts are demonstrated by curing layers at 385 nm with LED-UV to form a preceramic polymer, and then pyrolyzing the preceramic polymer at 1000° C. in inert atmosphere to form a pyrolyzed ceramic material. FIG. 2 shows a photograph of the preceramic polymer (right-hand side) and the darker pyrolyzed ceramic part (left-hand side).

Figure 3:
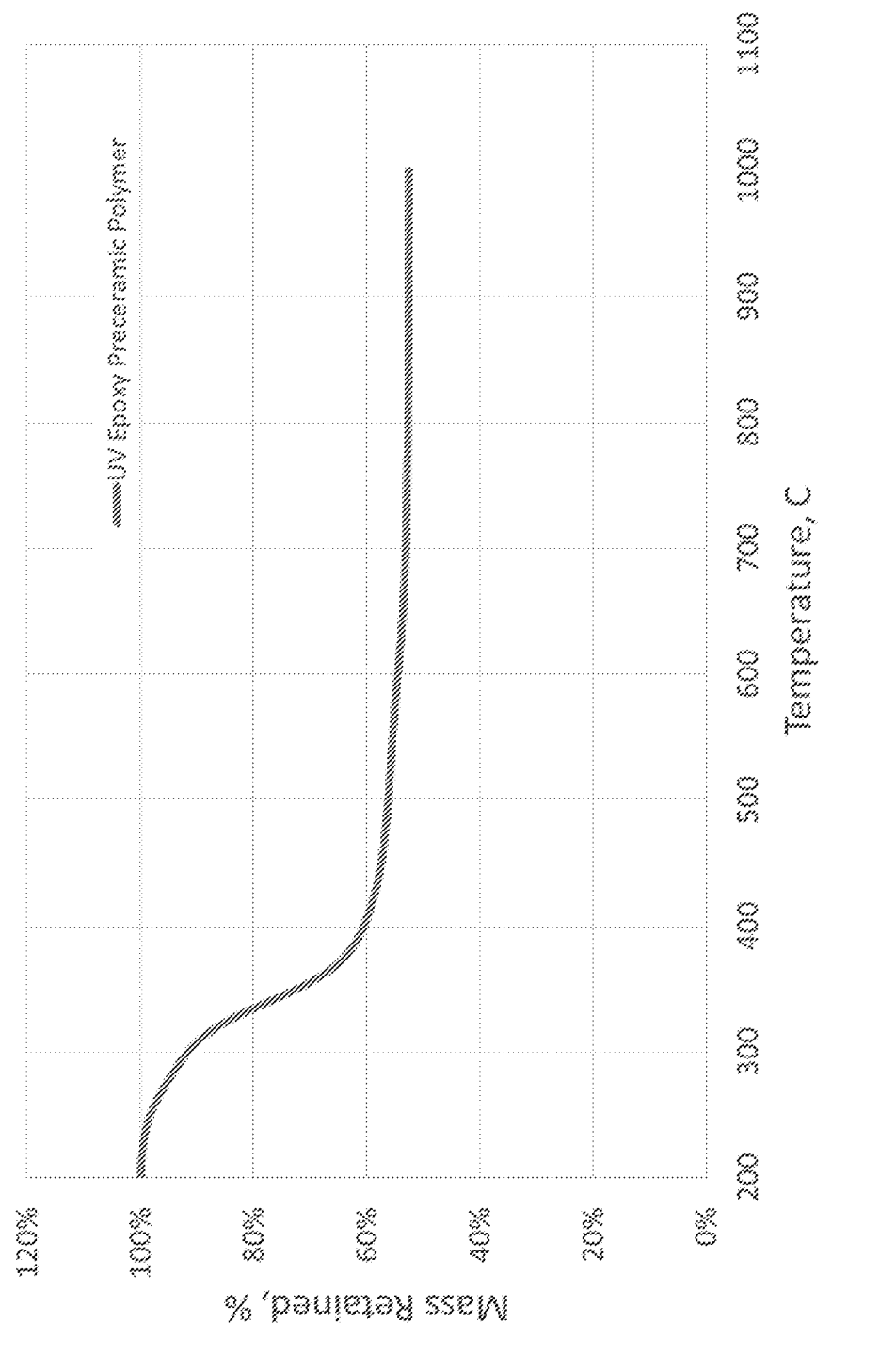
FIG. 3 is a graph of thermogravimetric analysis for the pyrolysis of a UV-cured preceramic polymer into a pyrolyzed ceramic material, measuring the loss of sample mass over time as the pyrolysis temperature increases, in Example 2.

FIG. 3 is a graph of thermogravimetric analysis for the pyrolysis of the UV-cured preceramic polymer into a pyrolyzed ceramic material, measuring the loss of sample mass over time as the pyrolysis temperature increases.

The versatility and the applications of these preceramic resin formulations make them especially useful. A variety of applications in the automotive and aerospace industries, among others, may benefit from the ability to 3D-print high-strength and high-temperature ceramic structures which can be derived from the disclosed formulations. These ceramic 3D parts or materials may be used for lightweight, high-temperature structural applications or for other applications that utilize the unique microstructures, such as (but not limited to) jet engine nozzles, nose cones, catalyst support, engine components, and microelectromechanical systems and devices.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A 3D-printing composition comprising:
   (a) from about 10 vol % to about 99.9 vol % of one or more preceramic, UV-curable, silicon-containing monomers in a liquid phase; and
   (b) from about 1 vol % to about 70 vol % of solid-phase fillers, wherein said solid-phase fillers are selected from the group consisting of SiOC, SiCN, SiC, SiCBN, SiOCN, SiAlON, $Si_3N_4$, $SiO_2$, silicate glasses, $Al_2O_3$, $ZrO_2$, $TiO_2$, carbon, TiC, ZrC, HfC, $Y_3Al_5O_{12}$, $B_4C$, BN, TiN, ZrN, AlN, and combinations thereof, and wherein at least some of said solid-phase fillers contain a surface treatment that increases the compatibility, solubility, and/or bonding reactivity of said solid-phase fillers with said silicon-containing monomers, and wherein at least some of said solid-phase fillers contain one or more surface-functional groups selected from the group consisting of silane, methoxy silane, ethoxy silane, vinyl, ethynyl, vinyl ether, vinyl ester, vinyl amide, vinyl triazine, vinyl isocyanurate, acrylate, methacrylate, diene, triene, mercapto, thiol, oxirane, oxetane, and combinations, analogues, or derivatives thereof.

2. The composition of claim 1, wherein said preceramic, UV-curable, silicon-containing monomers are selected from the group consisting of silazanes, siloxanes, silanes, carbosilanes, and combinations, analogues, or derivatives thereof.

3. The composition of claim 1, wherein said solid-phase fillers are in the form of fibers, whiskers, nanotubes, nanorods, flat platelets, microparticles with average diameter from 1 micron to 100 microns, nanoparticles with average diameter from 1 nanometer to 1000 nanometers, or combinations thereof.

4. The composition of claim 1, wherein said solid-phase fillers are in the form of fibers with average length from 1 micron to 100 microns and with average diameter that is less than 10% of said average length, and wherein said solid-phase fillers are selected from the subgroup consisting of $Si_3N_4$, $Al_2O_3$, $SiO_2$, BN, $Y_3Al_5O_{12}$, $ZrO_2$, and combinations thereof.

5. The composition of claim 1, wherein said solid-phase fillers are coated with an interfacial coating.

6. The composition of claim 5, wherein said interfacial coating includes a material selected from the group consisting of BN, C, AlN, and combinations thereof.

7. The composition of claim 1, wherein at least some of said solid-phase fillers are chemically bonded to said silicon-containing monomers.

8. The composition of claim 1, wherein said composition further comprises a reactive or non-reactive surfactant and/or a reactive or non-reactive wetting agent.

9. The composition of claim 1, wherein at least some of said solid-phase fillers are coated with a UV-reflective material, wherein said UV-reflective material is optionally selected from the group consisting of Al, Ni, Sn, Ag, Rh, Au, and combinations or alloys thereof.

10. The composition of claim 1, wherein at least some of said solid-phase fillers are coated with a protective material that inhibits degradation of said solid-phase fillers during high-temperature pyrolysis.

11. The composition of claim 1, wherein at least some of said solid-phase fillers are coated with a sacrificial material that selectively degrades, thereby inhibiting degradation of said solid-phase fillers during high-temperature pyrolysis.

12. A ceramic matrix composite comprising a pyrolyzed form of a 3D-printed, UV-cured composition according to claim 1.

13. A 3D-printing composition comprising:
   (a) from about 10 vol % to about 99.9 vol % of one or more preceramic monomers in a liquid phase; and
   (b) from about 1 vol % to about 70 vol % of solid-phase fillers, wherein said solid-phase fillers contain one or more surface-functional groups selected from the group consisting of silane, methoxy silane, ethoxy silane, vinyl, ethynyl, vinyl ether, vinyl ester, vinyl amide, vinyl triazine, vinyl isocyanurate, acrylate, methacrylate, diene, triene, mercapto, thiol, oxirane, oxetane, and combinations, analogues, or derivatives thereof, wherein at least some of said solid-phase fillers contain a surface treatment that increases the compatibility, solubility, and/or bonding reactivity of said solid-phase fillers with said preceramic monomers, and wherein said solid-phase fillers are coated with an interfacial coating disposed between said surface-functional groups and the surface of said solid-phase fillers.

14. The composition of claim 13, wherein said preceramic monomers are UV-curable monomers selected from the group consisting of silazanes, siloxanes, silanes, carbosilanes, and combinations, analogues, or derivatives thereof.

15. The composition of claim 13, wherein said preceramic monomers are non-UV-curable monomers, and wherein said surface-functional groups react with said preceramic monomers when exposed to UV radiation.

16. The composition of claim 13, wherein said solid-phase fillers are selected from the group consisting of SiOC, SiCN, SiC, SiCBN, SiOCN, SiAlON, $Si_3N_4$, $SiO_2$, silicate glasses, $Al_2O_3$, $ZrO_2$, $TiO_2$, carbon, TiC, ZrC, HfC, $Y_3Al_5O_{12}$, $B_4C$, BN, TiN, ZrN, AN, and combinations thereof.

17. The composition of claim 13, wherein at least some of said surface-functional groups are attached to silane compounds that are in turn attached to said solid-phase fillers.

18. The composition of claim 13, wherein said surface-functional groups, when exposed to UV radiation, are reactive with said preceramic monomers.

19. The composition of claim 13, wherein said solid-phase fillers are in the form of fibers, whiskers, nanotubes, nanorods, flat platelets, microparticles with average diameter from 1 micron to 100 microns, nanoparticles with average diameter from 1 nanometer to 1000 nanometers, or combinations thereof.

20. The composition of claim 13, wherein said solid-phase fillers are in the form of fibers with average length from 1 micron to 100 microns and with average diameter that is less than 10% of said average length, and wherein said solid-phase fillers are selected from the subgroup consisting of $Si_3N_4$, $Al_2O_3$, $SiO_2$, BN, $Y_3Al_5O_{12}$, $ZrO_2$, and combinations thereof.

21. The composition of claim 13, wherein at least some of said solid-phase fillers are coated with a protective material that inhibits degradation of said solid-phase fillers during high-temperature pyrolysis, and wherein said protective material is disposed between said surface-functional groups and the surface of said solid-phase fillers.

22. The composition of claim 13, wherein at least some of said solid-phase fillers are coated with a sacrificial material that selectively degrades, thereby inhibiting degradation of said solid-phase fillers during high-temperature pyrolysis, and wherein said sacrificial material is disposed between said surface-functional groups and the surface of said solid-phase fillers.

23. The composition of claim 13, wherein said interfacial coating includes a material selected from the group consisting of BN, C, AlN, and combinations thereof.

24. A ceramic matrix composite comprising a pyrolyzed form of a 3D-printed, UV-cured composition according to claim 13.

25. A 3D-printing composition comprising:
(a) from about 10 vol % to about 99.9 vol % of one or more preceramic monomers in a liquid phase; and
(b) from about 1 vol % to about 70 vol % of solid-phase fillers, wherein said solid-phase fillers are whiskers or fibers, wherein said solid-phase fillers contain one or more surface-functional groups, and wherein said solid-phase fillers are coated with an interfacial coating disposed between said surface-functional groups and the surface of said solid-phase fillers.

* * * * *